United States Patent
Takahashi

(10) Patent No.: US 8,342,930 B2
(45) Date of Patent: Jan. 1, 2013

(54) GAME EXECUTION CONTROL METHOD, STORAGE MEDIUM, AND ELECTRONIC INSTRUMENT

(75) Inventor: Tohru Takahashi, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 0 days.

(21) Appl. No.: 13/074,512

(22) Filed: Mar. 29, 2011

(65) Prior Publication Data

US 2011/0244965 A1    Oct. 6, 2011

(30) Foreign Application Priority Data

Mar. 30, 2010  (JP) .................................. 2010-079882

(51) Int. Cl.
  *A63F 9/24*    (2006.01)
  *A63F 13/00*    (2006.01)
  *G06F 17/00*    (2006.01)
  *G06F 19/00*    (2011.01)
(52) U.S. Cl. ........................................................... 463/9
(58) Field of Classification Search .................. 463/9, 10
  See application file for complete search history.

(56) References Cited

FOREIGN PATENT DOCUMENTS

JP    A-2004-105534    4/2004

OTHER PUBLICATIONS

Warhammer, http://www.dragon-warrior.com/Games/rules.html. Created Feb. 10, 2007.*
IGN, Mario Party 8, http://guides.ign.com/guides/853824/page_2.html. Created May 29, 2007.*
Monopoly~Be a Millionaire!~, "Dengeki Game Cube", MediaWorks Inc., Aug. 1, 2003, p. 149, vol. 3 No. 9, Japan (with partial English translation).
Yayoi Honda, "Culdcept Official Guide Basic", ASCII Corporation, Nov. 20, 1997, 1$^{st}$ Edition, p. 6-46, Japan (with partial English translation).

* cited by examiner

*Primary Examiner* — David L Lewis
*Assistant Examiner* — Reginald Renwick
(74) *Attorney, Agent, or Firm* — Oliff & Berridge, PLC

(57) ABSTRACT

When a piece 6a has stopped at an empty element 3, a castle 10 can be built at the element, and ownership can be set to the element. When another piece 6b has stopped at the element to which the ownership has been set, a sub-game is executed so that a player who owns the castle 10 (element 3), another player who uses a piece 6b, and a third player who uses a piece 6c that is positioned within a given range from the castle 10 participate in the sub-game. When the player who owns the castle 10 has won the sub-game, the player can collect the cost of staying from the player who uses the piece 6b. When the player who uses the piece 6b has won the sub-game, the player who uses the piece 6b can acquire the ownership of the castle 10.

10 Claims, 27 Drawing Sheets

COST OF STAYING =
f (CASTLE LEVEL, NUMBER OF CASTLES CONNECTED)

FIG. 18

| SUB-GAME SELECTION CONDITION OPTION SETTING DATA 526b | | |
|---|---|---|
| CASTLE LEVEL | SUB-GAME SELECTION CONDITION OPTION | |
| 1 | FIRST CATEGORY "CARD", "SHOOTING", "RACE", ... | |
| 2 | FIRST CATEGORY "CARD"<br>SECOND CATEGORY "INTELLECT", "SPEED", "LUCK", ... | FIRST CATEGORY "SHOOTING"<br>SECOND CATEGORY "HORIZONTAL SCROLL", "CLAY", ... |
| 3~5 | FIRST CATEGORY "CARD"<br>SECOND CATEGORY "INTELLECT"<br>SUB-GAME ID "CARD 01" "CARD 02" ... | FIRST CATEGORY "CARD"<br>SECOND CATEGORY "INTELLECT"<br>SUB-GAME ID "CARD 11" "CARD 12" ... |
| | FIRST CATEGORY "SHOOTING"<br>SECOND CATEGORY "HORIZONTAL SCROLL"<br>SUB-GAME ID "SHOOTING 01" "SHOOTING 02" ... | FIRST CATEGORY "SHOOTING"<br>SECOND CATEGORY "CLAY"<br>SUB-GAME ID "SHOOTING 11" "SHOOTING 12" ... |

FIG. 20

| PIECE STATUS DATA | | | | | | |
|---|---|---|---|---|---|---|
| CON-TROLLER ID | PIECE TYPE | CURRENT ELEMENT ID | POINTS | ABILITY PARAMETER VALUE | COLOR | ... |
| CN1 |  | K23 | 10 | HP=100<br>ATTACK CAPABILITY=10<br>DEFENSE CAPABILITY=20<br>MOVING CAPABILITY=30<br>SPEED=5 | 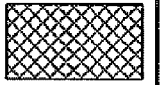 | ... |
| CN2 |  | K20 | 6 | HP=40<br>ATTACK CAPABILITY=10<br>DEFENSE CAPABILITY=8<br>MOVING CAPABILITY=15<br>SPEED=30 |  | ... |
| CN3 |  | K18 | 25 | HP=180<br>ATTACK CAPABILITY=30<br>DEFENSE CAPABILITY=5<br>MOVING CAPABILITY=10<br>SPEED=2 | 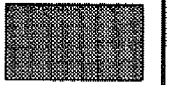 | ... |
| ... | ... | ... | ... | ... | ... | ... |

FIG. 21

| 550 | CASTLE STATUS DATA | |
|---|---|---|
| 550a | CASTLE ID | CS001 |
| 550b | CURRENT ELEMENT | K04 |
| 550c | OWNER ID | CN1 |
| 550d | CASTLE LEVEL | 3 |
| 550e | CASTLE MODEL ID | MS01 |

| 550f | SUB-GAME SELECTION CONDITION | |
|---|---|---|
| 550g | FIRST CATEGORY | "CARD" |
| 550h | SECOND CATEGORY | "INTELLECT" |
| 550j | SUB-GAME DESIGNATION | "CARD 01" |

FIG. 22

| 560 | ADVANCE NUMBER MANAGEMENT DATA | |
|---|---|---|
| 560a | CONTROLLER ID | ADVANCE NUMBER (560b) |
| | CN1 | 0 |
| | CN2 | 2 |
| | CN3 | 1 |
| | ⋮ | ⋮ |

GAME EXECUTION CONTROL METHOD, STORAGE MEDIUM, AND ELECTRONIC INSTRUMENT

Japanese Patent Application No. 2010-079882 filed on Mar. 30, 2010, is hereby incorporated by reference in its entirety.

BACKGROUND

A board game has been known as a video game. A board game is normally configured so that a course in which a plurality of elements are arranged is provided on a game field, a piece (e.g., character or card) used by each player (human player or computer-controlled player) being disposed in each element. The piece is moved based on the number determined by roulette or a dice, and each player aims to reach a given goal earlier than other players (competitive game).

A board game is mainly differentiated by changing the design of the character (piece) or the game field, setting a specific view of the world, setting an event that occurs when the piece has stopped at a specific element on the course, or setting a disturbance rule between the players.

When executing a battle sub-game as an event that occurs during the game, a situation in which a player other than a player who participates in the sub-game must wait for the sub-game to end, and may lose interest in the game may occur. The following technology focuses on this problem. Specifically, a first mode in which a plurality of players sequentially play the game, and a second mode in which at least one player plays the game are executed in parallel, and a player skips the game play in the second mode if his turn came in the first mode, and the next player plays the game in the second mode (see JP-A-2004-105534, for example).

SUMMARY

According to one aspect of the invention, there is provided a game execution control method that is implemented by a computer, the method comprising:

setting ownership to an element to which ownership has not been set when a piece has stopped at the element;

executing a sub-game when one piece has stopped at an element to which ownership has been set by another piece, the one piece and the other piece participating in the sub-game;

transferring the ownership set to the element at which the one piece has stopped to the one piece when the one piece has won the sub-game; and giving a benefit to the other piece when the other piece has won the sub-game.

According to another aspect of the invention, there is provided an electronic instrument comprising:

an ownership setting section that sets ownership to an element to which ownership has not been set when a piece has stopped at the element;

a sub-game execution control section that executes a sub-game when one piece has stopped at an element to which ownership has been set by another piece, the one piece and the other piece participating in the sub-game;

an ownership transfer section that transfers the ownership set to the element at which the one piece has stopped to the one piece when the one piece has won the sub-game; and an owner benefit giving section that gives a benefit to the other piece when the other piece has won the sub-game.

BRIEF DESCRIPTION OF THE DRAWINGS

FIG. 18 is a view showing a data configuration example of sub-game selection condition option setting data.

FIG. 20 is a view showing a data configuration example of piece status data.

FIG. 21 is a view showing a data configuration example of castle status data.

FIG. 22 is a view showing a data configuration example of advance number management data.

DESCRIPTION OF EXEMPLARY EMBODIMENTS

Figure 1:
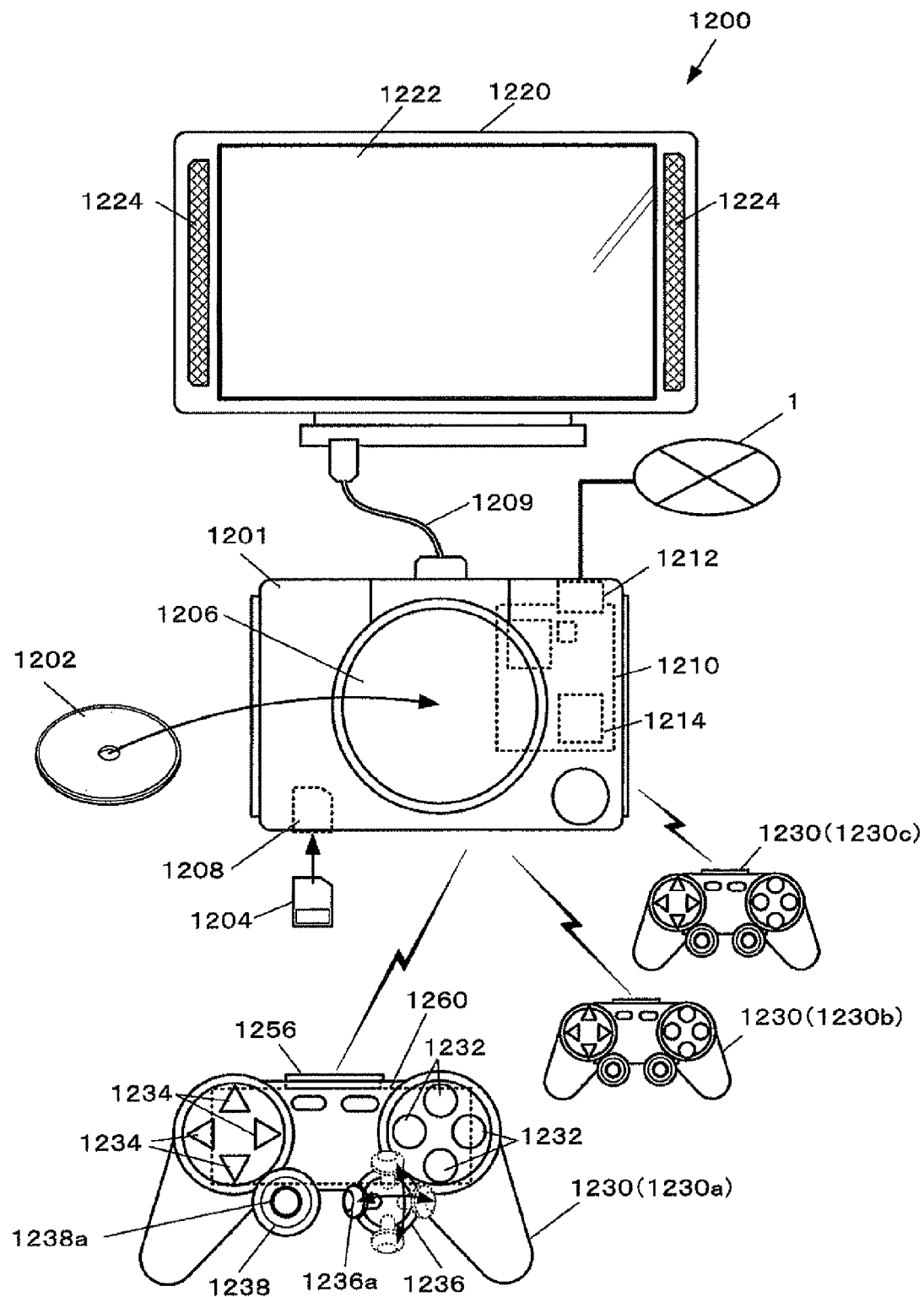
FIG. 1 is a view showing a system configuration example of a consumer game device.

A board game is a classic game, and can be enjoyed for a relatively long time. However, the user may lose interest in a board game. Therefore, a board game provided with novel game playability has been desired.

Several embodiments of the invention may implement a video board game that allows a plurality of players to simultaneously participate, and is provided with novel game playability that can enliven the game.

According to one embodiment of the invention, there is provided a game execution control method that is implemented by a computer, the method comprising:

setting ownership to an element to which ownership has not been set when a piece has stopped at the element;

executing a sub-game when one piece has stopped at an element to which ownership has been set by another piece, the one piece and the other piece participating in the sub-game;

transferring the ownership set to the element at which the one piece has stopped to the one piece when the one piece has won the sub-game; and giving a benefit to the other piece when the other piece has won the sub-game.

According to another embodiment of the invention, there is provided an electronic instrument comprising:

an ownership setting section that sets ownership to an element to which ownership has not been set when a piece has stopped at the element;

a sub-game execution control section that executes a sub-game when one piece has stopped at an element to which ownership has been set by another piece, the one piece and the other piece participating in the sub-game;

an ownership transfer section that transfers the ownership set to the element at which the one piece has stopped to the one piece when the one piece has won the sub-game; and an owner benefit giving section that gives a benefit to the other piece when the other piece has won the sub-game.

According to this configuration, ownership can be set to each element that forms a course. When the piece has stopped at an element to which ownership has not been set, the player who uses the piece can set ownership to the element. When another piece has stopped at the element to which the ownership has been set, the sub-game can be executed so that the player who has set the ownership and the player who uses the piece that has stopped at the element participate in the sub-game.

The ownership is transferred to the player who uses the piece that has stopped at the element when this player has won the sub-game. A benefit is given to the player who owns the element when this player has won the sub-game.

The player who uses the piece that has stopped at the element can acquire the ownership of the element when this player has won the sub-game. The player who owns the element can maintain the ownership, and acquire a benefit by winning the sub-game. It is possible to motivate the player who participates in the sub-game to play the game, and enliven the game by thus adding novel game playability.

The method may further comprise:

setting a selection condition for the sub-game that is executed when a piece has stopped at an element to which ownership has been set, and the executing of the sub-game including selecting a sub-game from a plurality of sub-games based on the selection condition set for the element at which the one piece has stopped, and executing the selected sub-game.

According to this configuration, the player who owns the element can set the condition for selecting a sub-game from a plurality of candidate sub-games. Specifically, the player who owns the element can make a device on the course by selecting his favorite sub-game, or selecting the sub-game that is disadvantageous for the other player.

In the method, the selection condition may include a condition that designates a category of the sub-game.

This makes is possible to designate the category of the sub-game as the sub-game selection condition.

The category may be a game genre such as "shooting game", "puzzle game", and "music game", the ability of the player to play the game such as "strategy", "momentary judgment", and "memory", the play time, 3DCG or 2DCG, the scroll direction, and the like. The name of the game may also be used as the category.

If the categories have an inclusion relationship (e.g., main category and sub-category), and can be designated in stages depending on the game play status (particularly the element status), the player can plot his strategy in various ways.

In the method, the executing of the sub-game may include executing the sub-game in which a third piece other than the one piece and the other piece participates in addition to the one piece and the other piece, the method may further comprise giving a benefit to the third piece when the third piece has won the sub-game.

This makes it possible to cause a third player other than the player who owns the element (player who uses the other piece) and the player who has stopped the piece at the element (player who uses the one piece) to participate in the sub-game that is executed for the ownership of the element.

Since the third player who does not compete for the ownership of the element can participate in the game, the third player need not wait for completion of game play by another player. Moreover, since the third player who is caused to participate in the sub-game can acquire a benefit by winning the sub-game, the third player is motivated to plat the sub-game. This enlivens the game.

In the method, the executing of the sub-game may include causing the third piece that is positioned within a given range based on a position of the element at which the one piece has stopped to participate in the sub-game.

In the method, the executing of the sub-game may include causing the third piece that is positioned at an element to which an attribute has been set to participate in the sub-game, the attribute set to the element at which the third piece is positioned having a given relationship with an attribute set to the element at which the one piece has stopped.

Specifically, since the player who uses the third piece does not necessarily participate in the sub-game, the rhythm of game play can be appropriately varied (i.e., the player who uses the third piece does not participate in the sub-game at an appropriate frequency).

The third piece (i.e., the player who uses the third piece) may be selected from a range that satisfies a given position condition from the element at which the one piece has stopped by selecting a piece positioned within a given number of elements along the course, or selecting a piece included in a circular area (within a given distance range) in the game space around the element at which the one piece has stopped, for example.

When an attribute is set to each element, a third piece that is positioned at an element having an attribute the same as, similar to, or relative to, the attribute of the element at which the one piece has stopped.

The method may further comprise:

selecting an element so that an element owned by a high-ranking player is selected with higher probability; and changing a layout of a course to a layout in which the selected element is not passed at a given timing.

According to this configuration, some of the elements owned by the high-ranking player can be made unavailable by changing the course layout. This makes it possible to create a situation that is disadvantageous for the high-ranking player, so that the difference in result from another player does not increase. The difference in result can be reduced depending on the number of elements selected, or depending on the subsequent game process.

The layout may be changed by changing the total number of elements of the course, branching the course, deleting or connecting branches, changing the attribute of the course so that the piece cannot enter the course (e.g., submergence or destruction), or adding a bypass, for example.

According to another embodiment of the invention, there is provided a non-transitory computer-readable storage medium storing a program that causes a computer to execute the above method.

The term "storage medium" used herein refers to a magnetic disk, an optical disk, an IC memory, and the like.

Exemplary embodiments of the invention are described below taking an example in which a board game in which a number of players simultaneously participate is executed using a consumer game device (i.e., electronic instrument).

The following description is given on the assumption that three human players participate in the game. Note that the number of players who participate in the game changes every moment. The player is not limited to a human player, but may be a player that is automatically AI-controlled by a computer. Specifically, an arbitrary number of players may be computer-controlled players (non-playable characters (NPC)).

Configuration of Game Device

FIG. 1 is a system configuration diagram showing a configuration example of a consumer game device according to one embodiment of the invention.

A control unit 1210 includes a microprocessor (e.g., central processing unit (CPU) and graphics processing unit (GPU)), an IC memory, and the like, and controls each section of a consumer game device 1200.

The control unit 1210 includes a communication device 1212 that connects to a communication channel 1 (e.g., Internet, local area network (LAN), or wide area network (WAN)) via cable or wireless communication, and implements data communication with an external device. The control unit 1210 also includes a short-distance wireless communication module 1214, and exchanges data with a plurality of game controllers 1230 via short-distance wireless communication.

The control unit 1210 generates a game image and game sound based on an operation input signal received from the game controller 1230, and outputs an image signal and a sound signal based on the game image and the game sound to a video monitor 1220 (display monitor) connected to the game device main body 1201 via a cable 1209.

In this embodiment, a plurality of players simultaneously participate in the game using a plurality of game controllers 1230 (1230a to 1230c; the number of game controllers 1230 changes depending on the number of players who participate in the game), respectively.

The game controller 1230 includes push buttons 1232 used for selection, cancellation, timing input, and the like, four arrow keys 1234 used to individually input an upward, downward, rightward, or leftward direction, and a right analog lever 1236 and a left analog lever 1238 that allow the player to simultaneously input the operation direction and the amount of operation.

A controller control unit 1260 includes electronic components such as a microchip (e.g., CPU and a bus controller IC that controls data communication through the local bus circuit) and an IC memory, a short-distance wireless communication module 1256 that implements wireless communication with the short-distance wireless communication module 1214 of the game device main body 1201, and the like.

The consumer game device may acquire a program and setting data necessary for executing the game by connecting to the communication channel 1 via the communication device 1212, and downloading the program and the setting data from an external device.

Outline of Game

FIGS. 2 to 7 are views showing an example of a game image according to this embodiment.

Figure 2:
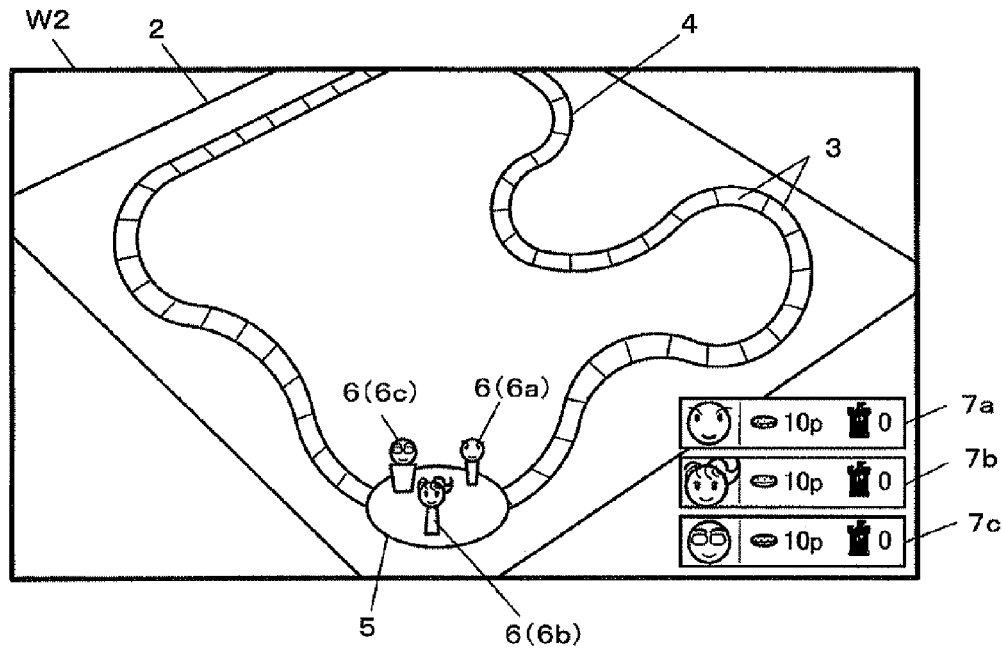
FIG. 2 shows an example of a game image immediately after the game has started.

As shown in FIG. 2, the video game according to this embodiment is a board game. Specifically, various objects such as a board 2 and a piece 6 are disposed in a virtual three-dimensional space. The virtual three-dimensional space photographed using a virtual camera is rendered, and various information indicators are added to the rendered game space image to generate a game image (image).

The board 2 is a game field that is deformable vertically (i.e., elevations and depressions can be formed). A course 4 is formed on the upper side of the board 2 by arranging a plurality of elements 3. The piece 6 (6a, 6b, 6c) selected by the player is moved from a starting element 5 according to a value determined by roulette.

The player can get given points each time the player has played roulette and moved the piece 6 (i.e., turn). The player can get points from another player depending on the position where the piece 6 has stopped.

The player accumulates points during the game. The accumulated points are displayed within an information display section 7 (7a, 7b, 7c) corresponding to each piece 6. The game ends when the points accumulated by one of the players have satisfied a given victory condition. The player whose points have satisfied the victory condition is a winner, and the ranking of each player is determined based on the accumulated points.

Specifically, all of the pieces 6 are disposed within the starting element 5 when the game has started (game image W2 shown in FIG. 2). The piece 6 of each player is then moved according to the number determined by roulette.

Figure 3:
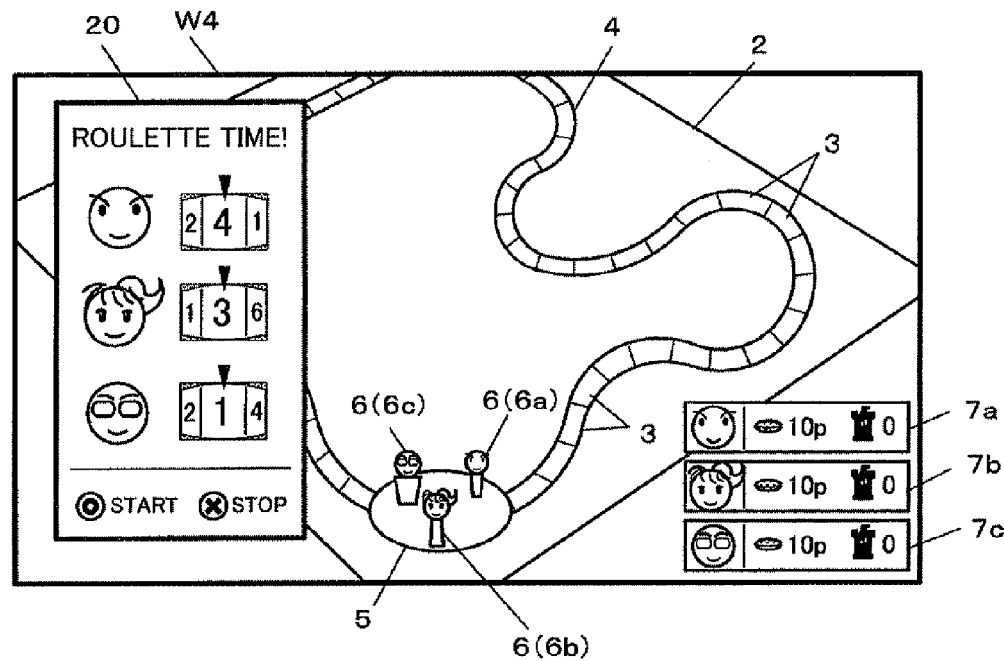
FIG. 3 shows an example of a game image during a roulette process.

The players simultaneously play roulette on the same screen so that the number by which the piece 6 is moved is determined (game image W4 shown in FIG. 3). A roulette image of each player is displayed within a roulette window 20. Each player performs a roulette start/stop operation using the game controller 1230. Since the players play roulette at the same time, each player need not wait for another player to play roulette, so that the players can enjoy the game together.

Figure 4:
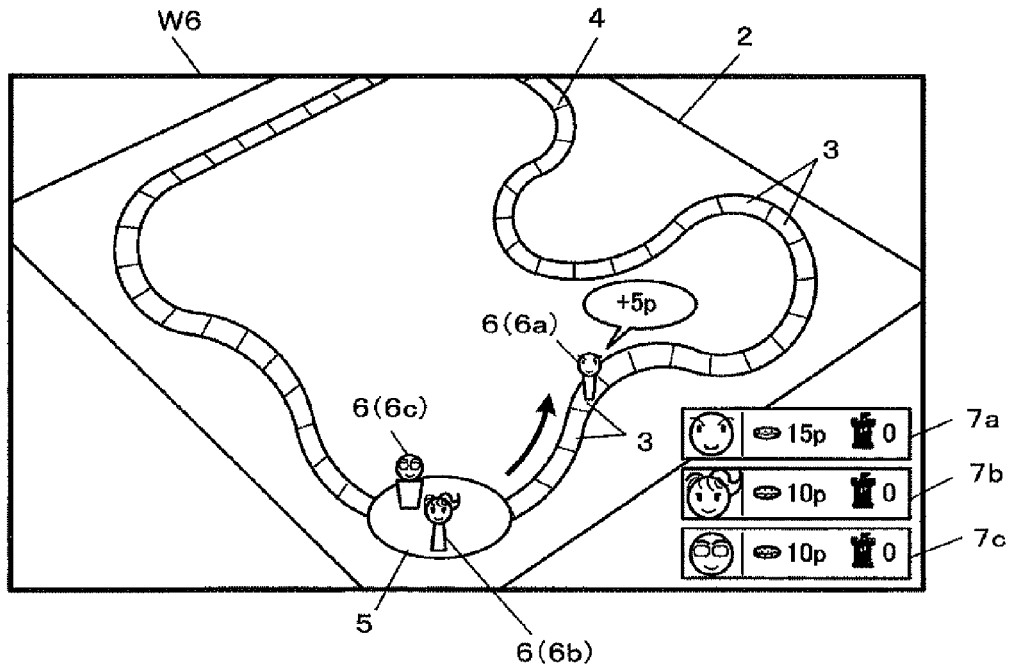
FIG. 4 shows an example of a game image when moving a piece and giving points.

Each piece 6 is then moved along the course 4 by the number determined by roulette (game image W6 shown in FIG. 4). For example, when the piece 6 has been moved to the element 3, the player who uses the piece 6 (6a in FIG. 4) gets given points (5 points in FIG. 4).

When the element 3 to which the piece 6 has been moved is empty, the player who uses the piece 6 (6a in FIG. 4) can build a castle at the element 3 (i.e., can acquire ownership of the element 3).

Figure 5:
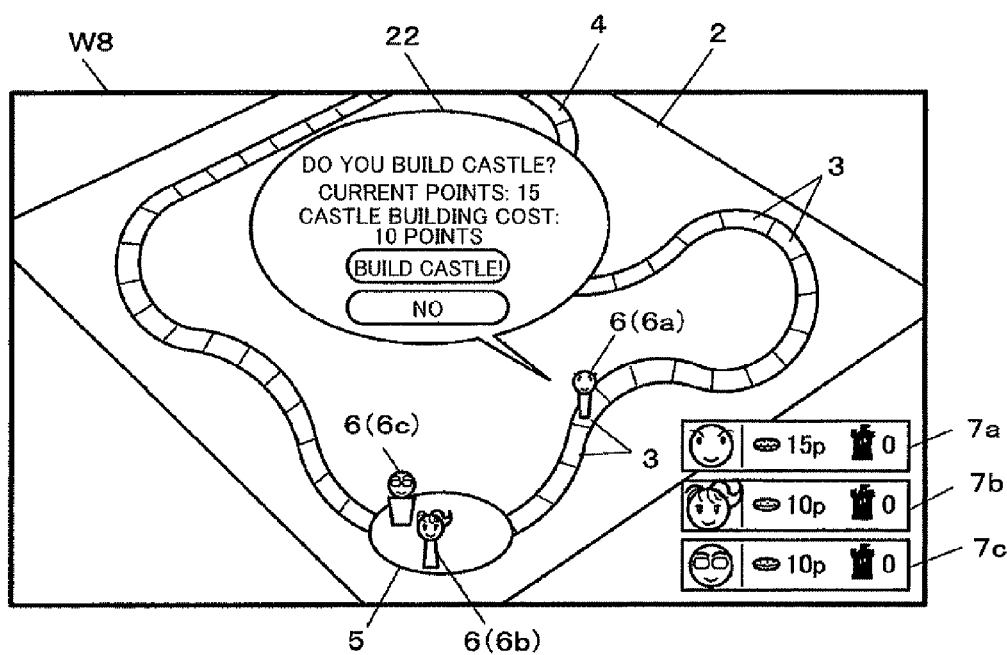
FIG. 5 shows an example of a game image in which a castle building selection window is displayed.

For example, a castle building selection window 22 is displayed as a balloon corresponding to the piece 6 (6a) (game image W8 shown in FIG. 5). The castle building selection window 22 indicates the current points of the player and the castle building cost, and allows the player to select whether or not to build a castle at the element 3.

Figure 6:
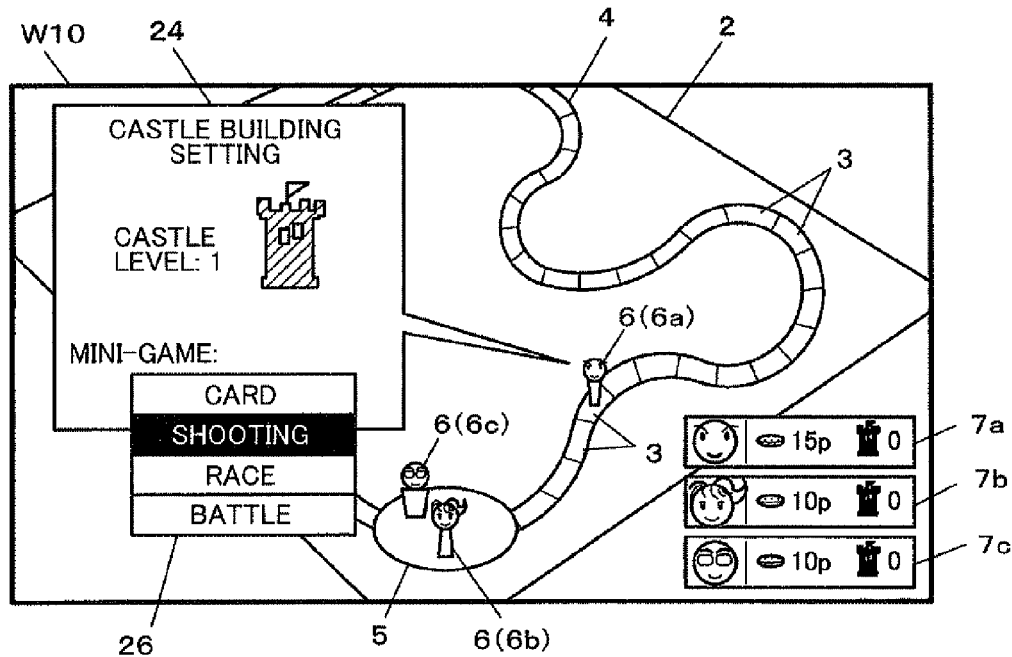
FIG. 6 shows an example of a game image in which a sub-game selection condition setting window is displayed.

When the player has selected the option "Build!" displayed within the castle building selection window 22, a sub-game selection condition setting window 24 is displayed as a balloon corresponding to the piece 6 (6a) (game image W10 shown in FIG. 6). A sub-game selection condition option 26 is displayed within the sub-game selection condition setting window 24. The player who uses the piece 6(6a) can select one of the options. The term "sub-game" used herein refers to a game that is executed for payment of the cost of staying and the ownership of a castle when the piece 6 of another player has stopped at the element 3 where a castle has been built. The play time of the sub-game (mini-game) is shorter than that of the board game.

The categories of the sub-game provided in advance are displayed within the sub-game selection condition setting window 24. In the example shown in FIG. 6, a category "shooting" has been selected from four categories "card", "shooting", "race", and "battle".

The castle level is initially set to "1". The player can increase the castle level by paying given points when the piece 6 has stopped at the castle. The options are displayed within the sub-game selection condition setting window 24 so that the category of the sub-game to be selected can be set in more detail as the castle level increases.

Figure 8:
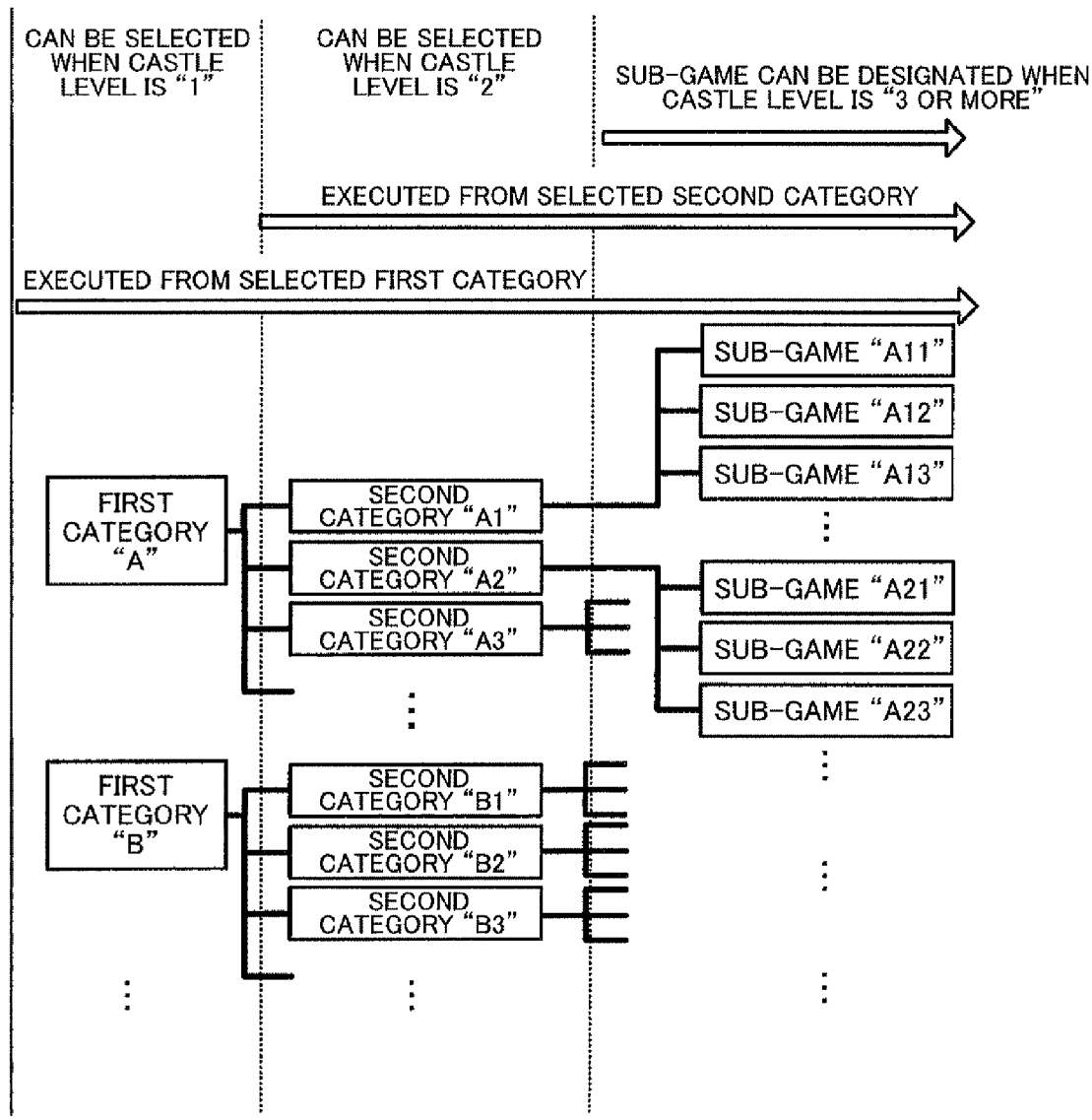
FIG. 8 is a schematic view showing a setting example of a sub-game selection condition.

FIG. 8 is a schematic view showing the relationship between the castle level and the category of the sub-game selection condition. When the castle level is "1", the player can select only a first category ("A", "B", . . . ) (main category). When the castle level has increased to "2", the player can select a second category (middle category) in addition to the first category. For example, when the first category is set to "A", the player can select one of the second categories "A1", "A2", "A3", . . . . In this embodiment, the player can directly select the sub-game when the castle level is set to "3".

Specifically, the owner of a castle 10 can arbitrarily select his favorite genre (sub-game).

Figure 7:
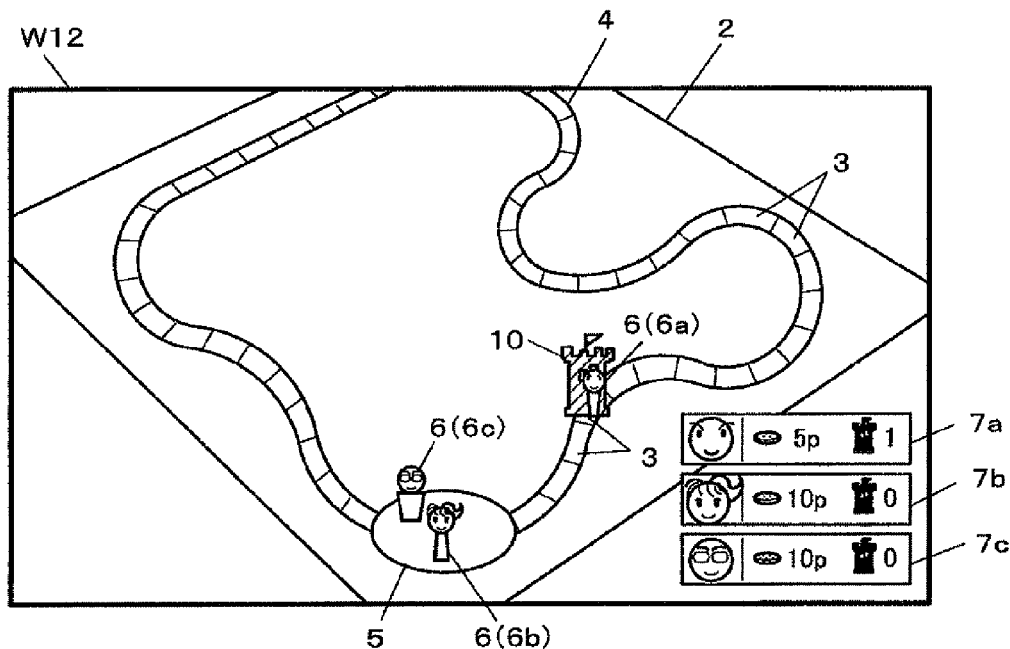
FIG. 7 shows an example of a game image in which a new castle is displayed.

When the player has selected the sub-game selection condition, the castle 10 at the level "1" is displayed at the element 3 where the piece 6 (6a) is positioned (game image W12 shown in FIG. 7).

The castle 10 is an object that indicates that ownership is set to the element and specifies the owner. Therefore, the color of the castle 10 is set corresponding to each piece 6 so that the owner of the castle can be visually specified.

When the piece 6 (piece 6b or 6c in FIG. 7) used by another player has stopped at the element 3 where the castle 10 has been built, the sub-game is executed for payment of the cost of staying and the ownership of the castle. Specifically, the castle 10 functions as an element for setting a reference point (i.e., the sub-game is executed when the character (piece 6) operated by the player has satisfied a given distance condition with respect to the reference point).

Figure 9:
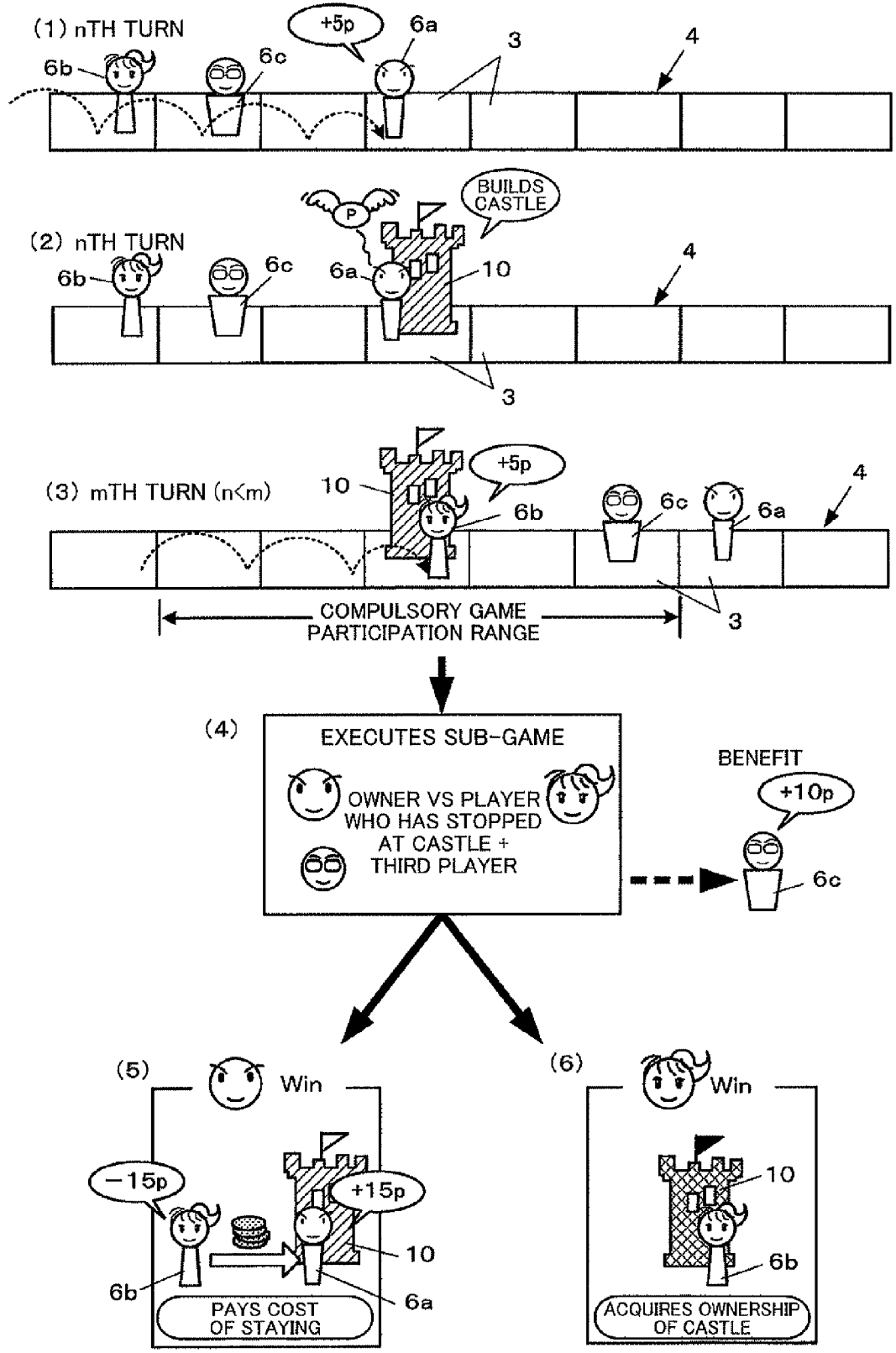
FIG. 9 is a schematic view illustrative of a sub-game and a benefit that is given based on the sub-game.

FIG. 9 is a schematic view illustrative of the sub-game and a benefit that is given based on the sub-game.

When the piece 6a has built the castle 10 at the nth turn ((1) and (2) in FIG. 9), and another piece 6b has stopped at the element where the castle 10 has been built at the mth turn, the sub-game that is selected based on the sub-game selection condition set to the castle 10 is executed ((3) and (4) in FIG. 9).

Since the sub-game is executed for payment of the cost of staying and the ownership of the castle, the player who uses the piece 6b that has stopped at the element 3 and the player who owns the castle 10 play the sub-game. In this embodiment, a third player who uses the piece 6c that is positioned within a given number of elements ("compulsory game participation range" in FIG. 9) around the element 3 where the castle 10 has been built also plays the sub-game.

When the sub-game has ended, whether the player who owns the castle 10 (i.e., the player who uses the piece 6a) or the player who uses the piece 6b has won the sub-game is determined. When the player who owns the castle 10 has won the sub-game, points corresponding to the level of the castle 10 are subtracted from the points possessed by the player who uses the piece 6b as the cost of staying at the castle 10, and given to the player who owns the castle 10 ((5) in FIG. 9). When the player who uses the piece 6b has won the sub-game, the player who uses the piece 6b can acquire the ownership of the castle 10 without paying the cost of staying at the castle 10 ((6) in FIG. 9). The color of the castle 10 is changed to the color corresponding to the piece 6b along with the transfer of the ownership of the castle 10.

A benefit is given to the player who uses the piece be and has participated in the sub-game as a third party based on the play result of the sub-game. For example, bonus points or an item that can be used in the main game or the sub-game is given to the player who uses the piece 6c.

In the board game according to this embodiment, the number of castles 10 and the execution frequency of the sub-game increase with the progress of the game. In this case, a third player also participates in the sub-game in addition to the players who bet payment of the cost of staying and the ownership of the castle.

A known board game is configured so that the player merely observes game play of another player until the player can play the game, and may lose interest in the game. However, since the board game according to this embodiment is configured so that the players can frequently participate in the game, the players rarely lose interest in the game. In order to participate in the sub-game as a third player, the piece used by the third player must be positioned within a given range from the element where the castle 10 has been built (where the piece 6b has stopped) (see FIG. 9). Specifically, since the player who uses the piece 6c does not necessarily participate in the sub-game (i.e., can observe the sub-game), the rhythm of game play can be appropriately varied.

Figure 10:
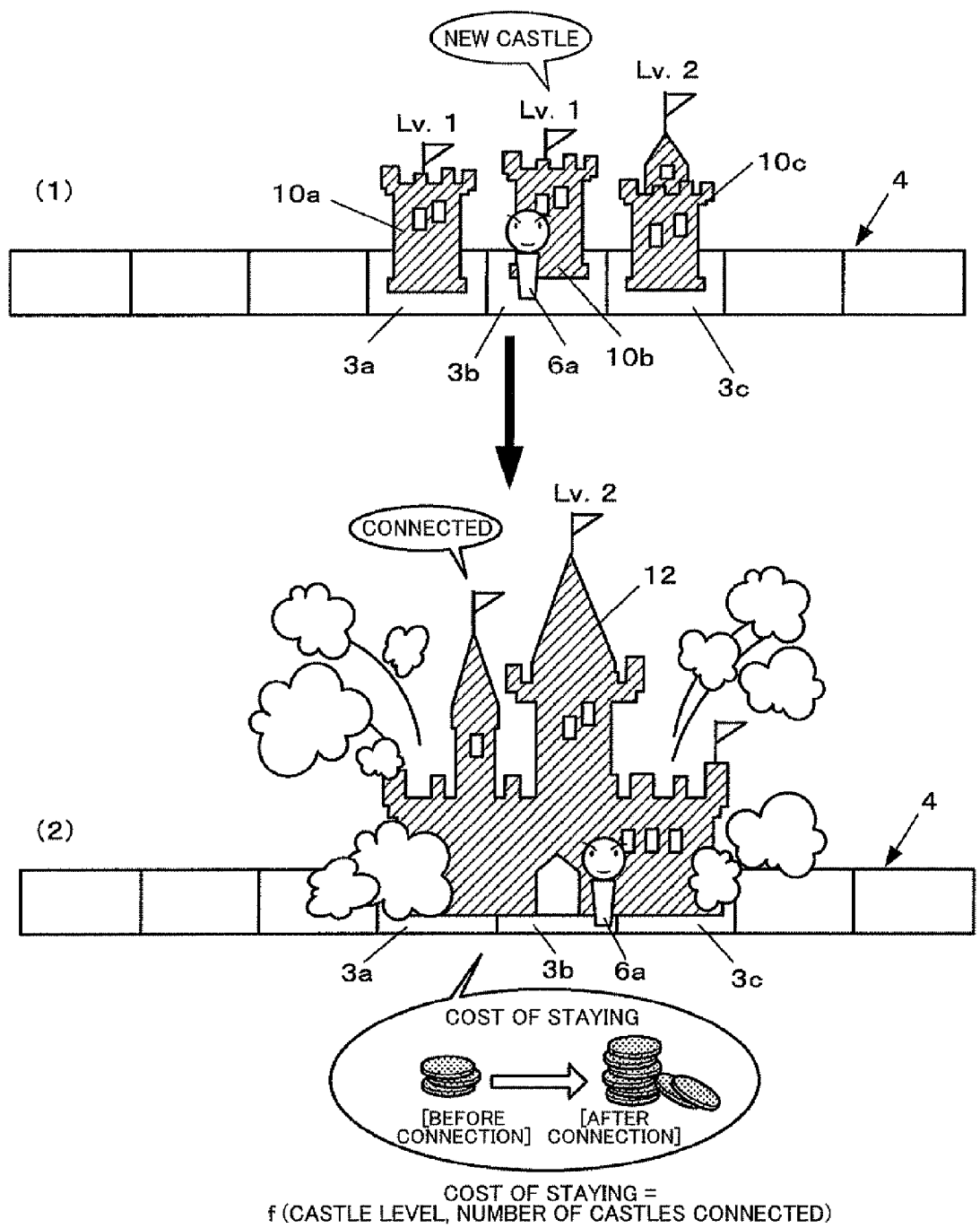
FIG. 10 is a schematic view illustrative of an increase in castle scale.

In this embodiment, when the player has built a plurality of castles at successive elements, the plurality of castles can be connected (i.e., connected castle). As shown in FIG. 10, when the player who uses the piece 6a has closely built castles 10a, 10b, and 10c ((1) in FIG. 10), the castles 10a, 10b, and 10c are automatically connected to form a connected castle 12.

In this case, the castles 10a, 10b, and 10c are replaced with the connected castle 12 that is formed across the elements 3a to 3c where the castles 10a, 10b, and 10c have been disposed ((2) in FIG. 10). When another piece has stopped at one of the elements 3a to 3c, the cost of staying is set to be higher than that of a single castle even if the castle level is the same.

Note that the number and the arrangement pattern of castles 10 necessary for replacing a plurality of castles 10a, 10b, and 10c with the connected castle 12 may be appropriately set. The castle level of the connected castle 12 is appropriately calculated based on the castle level of each of the castles 10a, 10b, and 10c. For example, the highest or lowest castle level of the castles 10a, 10b, and 10c may be set as the castle level of the connected castle 12, or the average value of the castle levels of the castles 10a, 10b, and 10c may be rounded off and set as the castle level of the connected castle 12.

Figure 11:
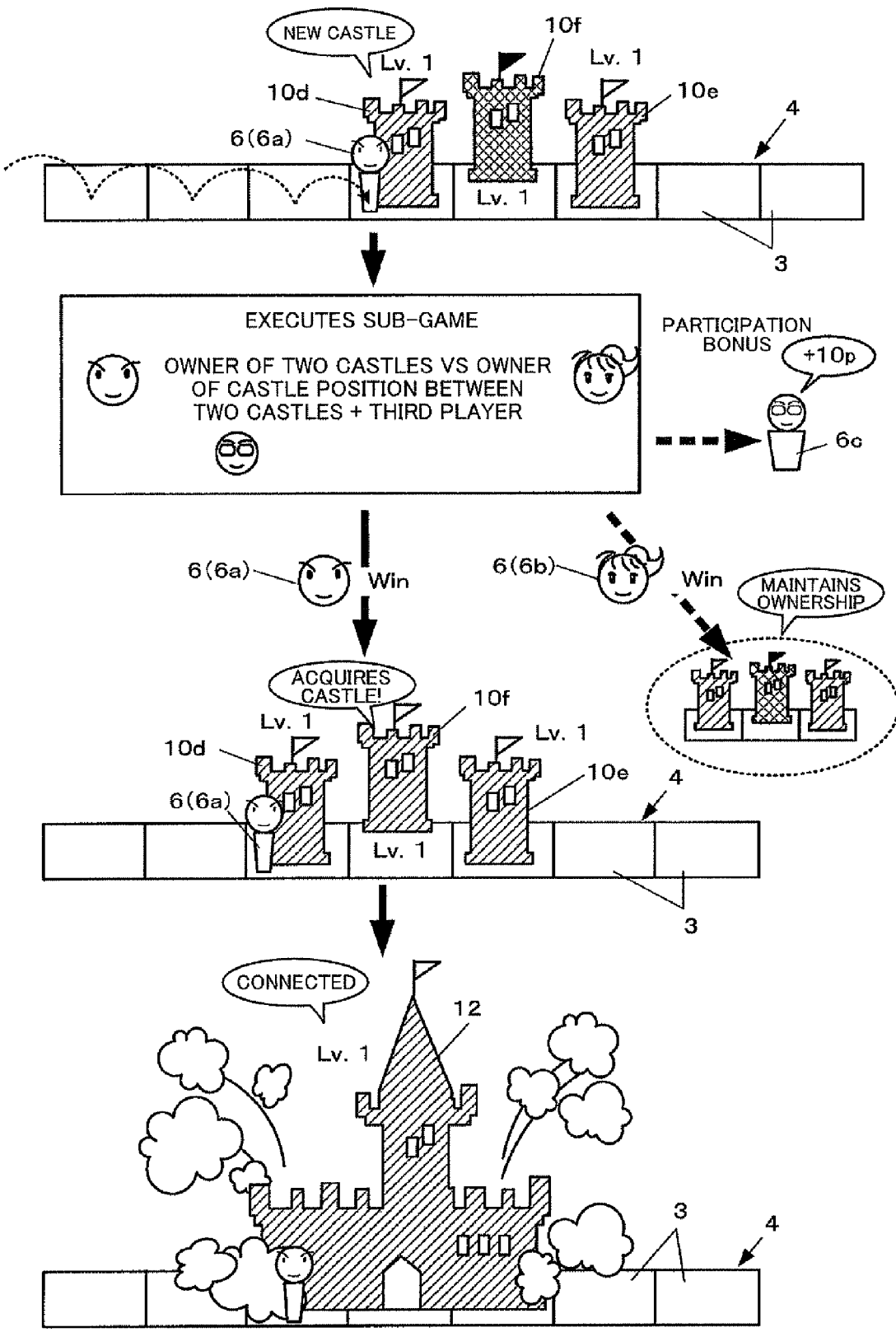
FIG. 11 is a schematic view illustrative of execution of a sub-game when a given placement condition has been satisfied.

In this embodiment, when the castle owned by the player and another castle (i.e., a castle owned by another player) have satisfied a given placement condition, the sub-game is executed for the ownership of another castle. As shown in FIG. 11, when the player has built two castles 10*d* and 10*e* on either side of another castle 10*f*, the sub-game is executed for the ownership of the castle 10*f*.

In this case, the sub-game is executed based on the sub-game selection condition of the castle 10*f*. The player who owns the castles (castles 10*d* and 10*e*) built on either side of the castle 10*f* (the player who uses the piece 6*a* in FIG. 11), the player who owns the castle (castle 10*f*) positioned between the castles 10*d* and 10*e* (the player who uses the piece 6*b* in FIG. 11), and a third player who uses the piece 6*c* that is positioned within a given range from the castle (castle 10*f*) positioned between the castles 10*d* and 10*e* participate in the sub-game.

Whether the player who owns the castles 10*d* and 10*e* or the player who owns the castle 10*f* has won the sub-game is determined based on the play result of the sub-game.

When the player who owns the castles 10*d* and 10*e* has won the sub-game, the player who owns the castles 10*d* and 10*e* can acquire the ownership of the castle 10*f* (i.e., the ownership of the castle 10*f* is transferred to the player who owns the castles 10*d* and 10*e*), and the castle 10*f* is displayed in the same manner as the castles 10*d* and 10*e*. As a result, the castles 10*d*, 10*e*, and 10*f* are changed to a single connected castle 12.

When the player who owns the castle 10*f* has won the sub-game, the player who owns the castle 10*f* can maintain the ownership of the castle 10*f*. In this case, given points may be subtracted from the points possessed by the player who owns the castles 10*d* and 10*e*, and given to the player who owns the castle 10*f*.

A benefit is given to the third player based on the play result.

The player can thus cause the sub-game to be executed for the ownership of another castle by building castles on either side of the other castle. The game playability is improved by thus adding a strategic factor relating to the castle arrangement. Moreover, since the players who participate in the board game more frequently perform a game operation as a result of increasing the execution frequency of the sub-game, the players can fully enjoy the game.

The board game according to this embodiment is provided with a function of calculating the ranking of the players based on the play result, and determining whether a given excessive difference in result exists between the top player and the bottom player, and a function of providing an opportunity to correct the excessive difference in result.

The term "excessive difference in result" refers to a difference in result that causes the bottom player to lose interest in the game (e.g., the bottom player feel that he cannot catch up with the top player or cannot defeat the top player). The determination condition for the excessive difference in result may be appropriately set depending on the content of the game, the age group of the players, and the like. For example, when executing a board game in which a player who has acquired the target points earlier than other players wins the game, it is determined that the excessive difference in result exists when (1) the difference in points between the top player and the bottom player is equal to or larger than a reference value, and (2) the points possessed by the top player have reached about 80% of the target value. Specifically, it is determined that the excessive difference in result exists when the top player reaches the target points in a short time (i.e., the remaining playable time may be short), and the bottom player considers that it is impossible to overcome a difference in points equal to or larger than the reference value.

Note that the excessive difference in result between players other than the top player and the bottom player may be appropriately determined. For example, the excessive difference in result may be determined based on the average result of several top players and the average result of several bottom players.

In this embodiment, when it has been determined that the excessive difference in result exists, the board 2 is deformed so that part of the course 4 including the element where the castle owned by the top player has been built cannot be used, so that points that can be acquired by the top player are reduced.

Figure 12:
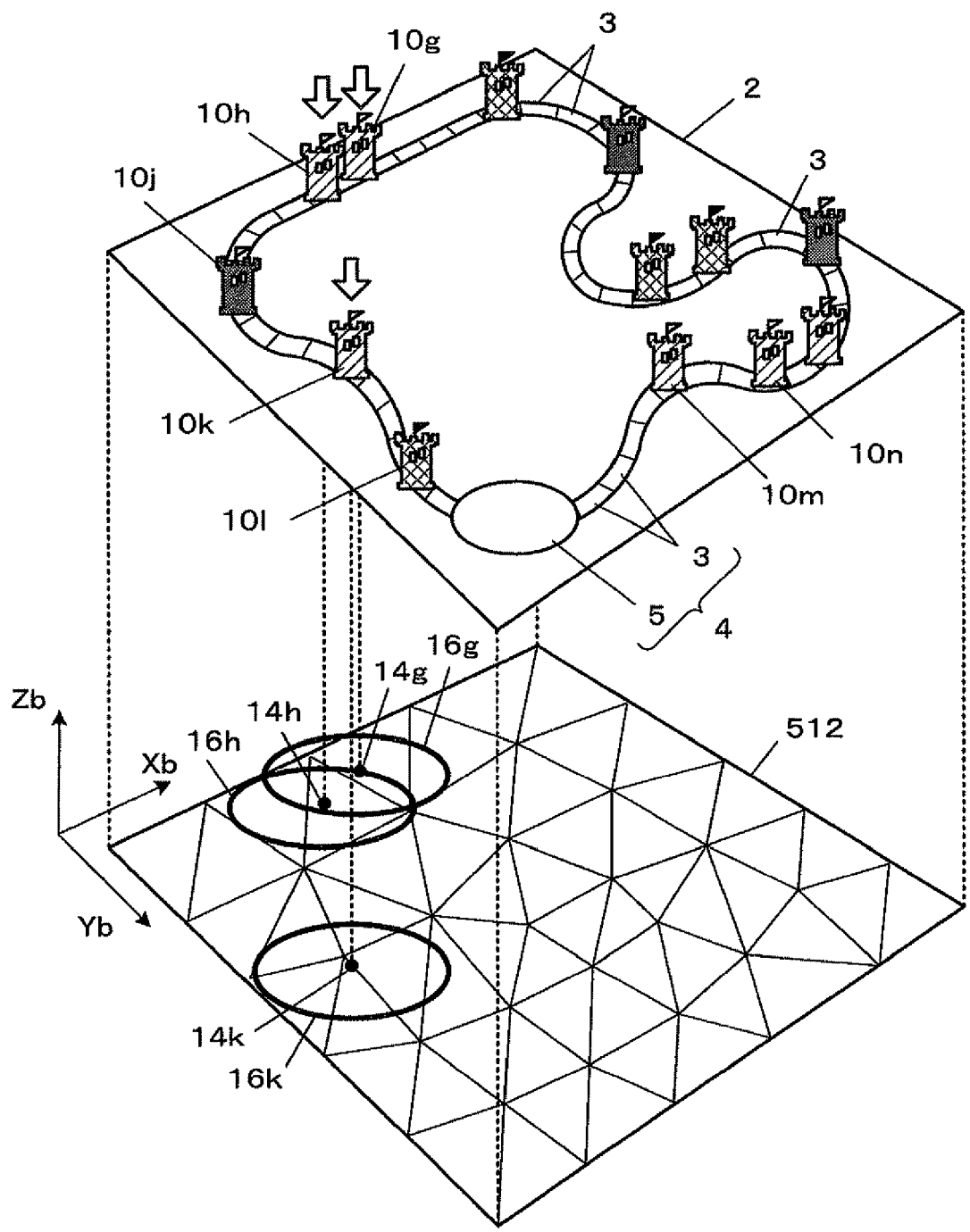
FIG. 12 is a schematic view illustrative of field deformation.
Figure 13:
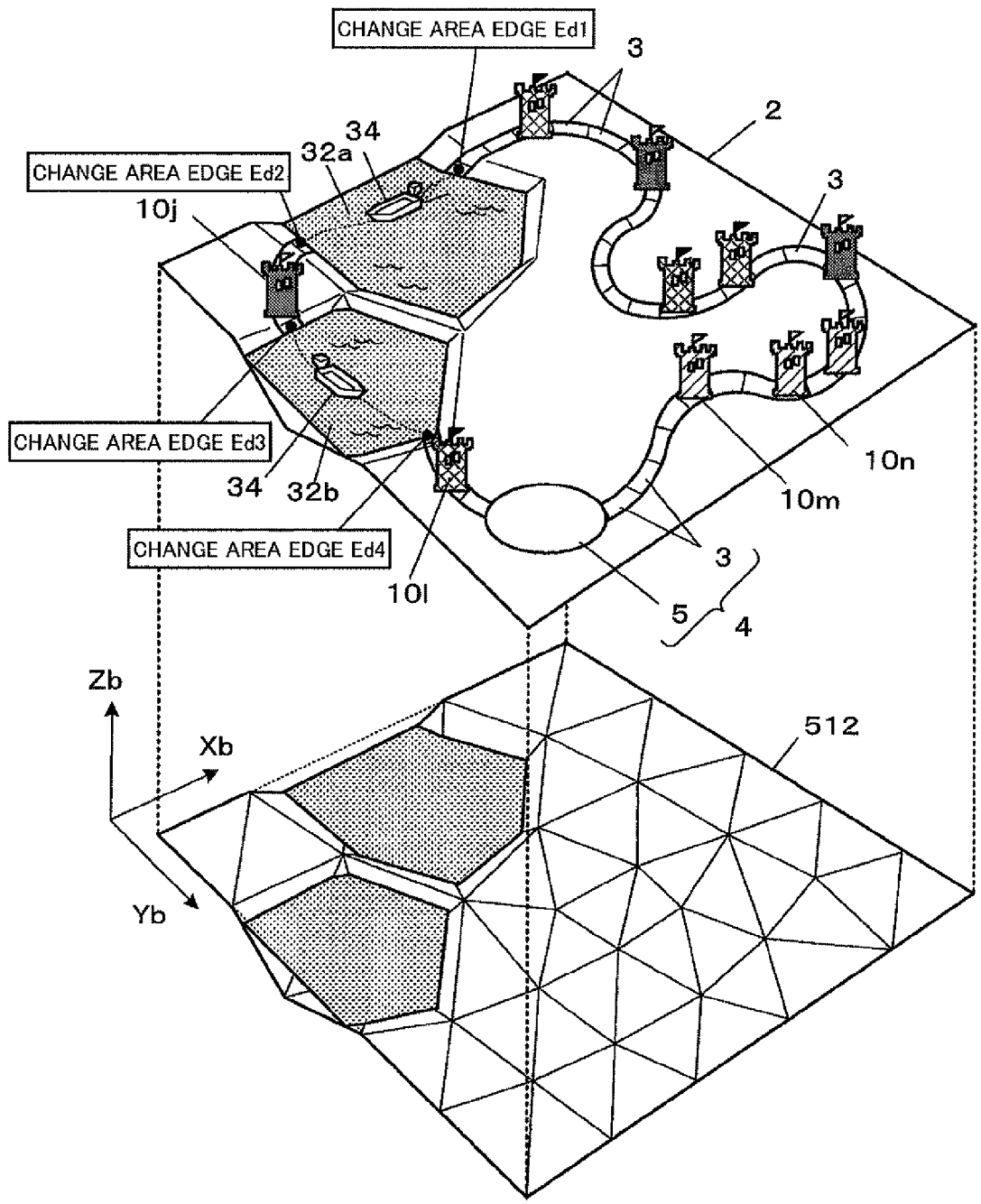
FIG. 13 is a schematic view illustrative of field deformation.

FIGS. 12 and 13 are schematic views showing the board 2 (game field) and a polygon model 512 of the board 2.

As shown in FIG. 12, a given number of castles owned by the top player (castles 10*g*, 10*h*, and 10*k* in FIG. 12) are selected from the castle 10 (10*g*, 10*h*, 10*k*, 10*k*, 10*l*, 10*m*, ...) owned by the players, and deformation areas 16*g*, 16*h*, and 16*k* are set over the course 4 based on representative points 14*g*, 14*h*, and 14*k* of the selected castles 10*g*, 10*h*, and 10*k*, for example.

As shown in FIG. 13, the polygon model 512 of the board 2 is deformed by reducing the height of the polygons of the deformation areas 16*g*, 16*h*, and 16*k* so that subsidence occurs around the representative points 14*g*, 14*h*, and 14*k*. A water surface object 32 (32*a*, 32*b*) that covers each deformation area is disposed so that the depression is filled with water.

Therefore, the elements included in the deformation areas 16*g*, 16*h*, and 16*k* are submerged, and the castles 10*g*, 10*h*, and 10*k* built at these elements cannot be used. The top player cannot acquire points using the castles 10*g*, 10*h*, and 10*k*. This makes it possible for the bottom player or the like to come from behind to win, and enjoy the game to the end.

Since the piece 6 cannot be moved to the element under the water surface object 32, a travel means character 34 is disposed on each water surface object 32, and automatically controlled to function as a ferry at the element that cannot be used. Specifically, when the piece 6 has moved along the course 4, and reached the submerged element (change area edge Ed1 or Ed3), the piece 6 is automatically moved to the element (change area edge Ed2 or Ed4) on the opposite bank. In the example shown in FIG. 13, the travel means character 34 is designed as a ferry boat. Note that the travel means character 34 may be designed as a bridge, an airship, a transporter that momentarily moves the piece to the opposite point, a transporter magic zone, or the like. When the travel means character 34 is designed as a bridge, an alternative element may be set on the bridge, and the arrangement of the castles in the deformation areas 16*g*, 16*h*, and 16*k* may be substantially reset.

The element may be reset to an element where a castle is not built by burning down the selected castles 10*g*, 10*h*, and 10*k* due to an unexpected fire (e.g., fire-setting or riot), or causing the selected castles 10*g*, 10*h*, and 10*k* to collapse due to subsidence.

Functional Blocks

Figure 14:
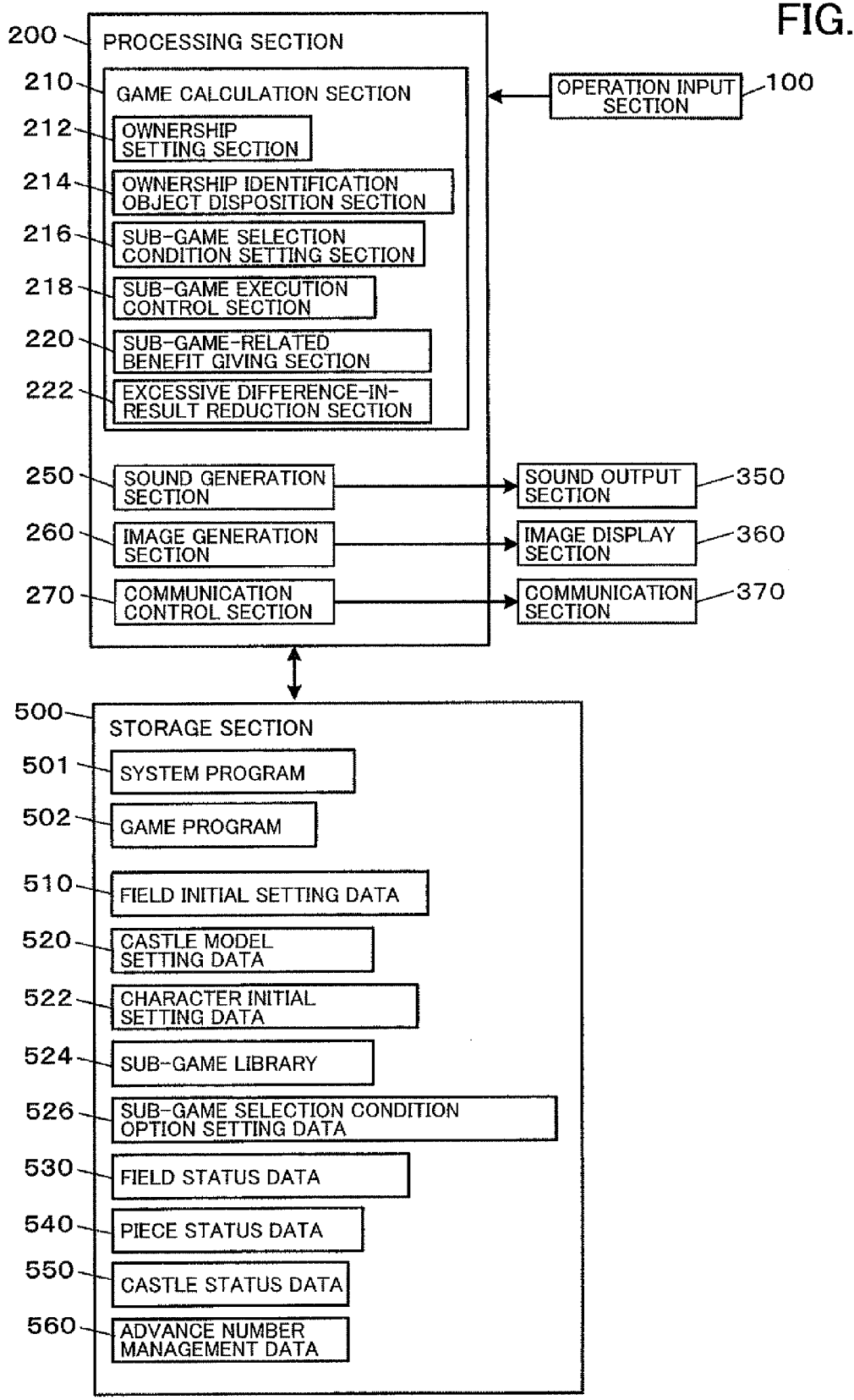
FIG. 14 is a functional block diagram showing a functional configuration example.

FIG. 14 is a functional block diagram showing a functional configuration example according to this embodiment.

An operation input section 100 outputs an operation input signal to a processing section 200 based on an operation input performed by the player. In FIG. 1, each game controller 1230 corresponds to the operation input section 100.

The processing section 200 controls the operation of the game device 1200 by performing various calculation processes based on a program, data, and the operation input signal from the operation input section 100. In FIG. 1, the control unit 1210 corresponds to the processing section 200.

The processing section 200 according to this embodiment includes a game calculation section 210, a sound generation section 250, an image generation section 260, and a communication control section 270.

The game calculation section 210 performs a board game execution process. The game calculation section 210 includes an ownership setting section 212, an ownership identification object disposition section 214, a sub-game selection condition setting section 216, a sub-game execution control section 218, a sub-game-related benefit giving section 220, and an excessive difference-in-result reduction section 222.

The ownership setting section 212 displays the castle building selection window 22 when the piece 6 has stopped at the element 3 to which the ownership is not set, allows the player who uses the piece 6 to select whether or not to set ownership to the element, and sets ownership to the element when the player has selected to set ownership to the element.

The ownership identification object disposition section 214 (1) disposes an object of the castle 10 having a castle level of "1" at the element to which ownership has been newly set as an object that identifies (indicates) the owner.

The ownership identification object disposition section 214 (2) detects an element owned by the same player around the element to which ownership has been newly set, and disposes the connected castle 12 as an object that extends over the element to which ownership has been newly set and the detected element.

The ownership identification object disposition section 214 (3) detects that the element to which ownership has been newly set and an element owned by the same player are positioned on either side of an element owned by a different player, and transfers the ownership of the detected element to the player who owns the element to which ownership has been newly set, based on the play result of the sub-game.

The sub-game selection condition setting section 216 displays the sub-game selection condition setting window 24 at a timing when ownership is newly set, and a timing when the piece used by the player has stopped at the element that is owned by that player. The sub-game selection condition setting section 216 sets the sub-game selection condition for the element based on the operation input performed by the player (when the player that sets ownership to the element is a human player (real player)), or by a random lottery (when the player that sets ownership to the element is an NPC). The options displayed as the sub-game selection condition option 26 are selected from the options that designate the category of the sub-game based on the castle level of the castle built at the element.

The sub-game execution control section 218 selects the sub-game when a given sub-game execution condition has been satisfied, determines players who participate in the sub-game, and performs a sub-game execution process. Specifically, the sub-game execution condition includes (A) a case where the piece used by one player has stopped at an element owned by another player, and (B) a case where a state in which a castle owned by another player is positioned between a new castle 10 and a castle owned by an identical player has been detected.

The sub-game execution control section 218 (1) selects one sub-game from a plurality of sub-games according to the sub-game selection condition set for an element at which one piece has stopped or an element where a new castle has been built, and (2) selects a third piece (piece used by a third player) that is positioned within a given range based on the position of the element at which one piece has stopped or the element where a new castle has been built. In this embodiment, a third piece (piece used by a third player) that is positioned within a given range based on the position of the element at which one piece has stopped or the element where a new castle has been built can be selected.

The sub-game execution control section 218 (3) executes the selected sub-game in which the player who uses the one piece, the player who uses another piece, and the player who uses the third piece participate when the sub-game execution condition (A) has been satisfied. The sub-game execution control section 218 (4) executes the selected sub-game in which the player who has built a new castle, the player whose castle is positioned between two castles, and the player who uses the third piece participate when the sub-game execution condition (B) has been satisfied.

The sub-game-related benefit giving section 220 gives points to the player who participates in the sub-game based on the play result of the sub-game.

Specifically, the sub-game-related benefit giving section 220 determines whether the player who uses the piece that has stopped at the element to which ownership has been set or the player who owns the element has won the sub-game, and gives a benefit to the winner. When the player who uses the piece that has stopped at the element has won the sub-game, the ownership of the element is transferred to the player who uses the piece that has stopped at the element. When the player who owns the element has won the sub-game, the castle level of the castle disposed at the element (i.e., points corresponding to the size of the object of the castle) is transferred from the player who uses the piece that has stopped at the element to the player who owns the element. The sub-game-related benefit giving section 220 also gives a benefit to the third player who has participated in the sub-game. For example, the sub-game-related benefit giving section 220 may give a benefit to the third player when the third player has won the sub-game.

The sub-game-related benefit giving section 220 (2) detects that an element to which ownership has been newly set and an element owned by the same player are positioned on either side of an element owned by a different player, and gives a benefit to one of the players. Specifically, the sub-game-related benefit giving section 220 transfers the ownership of the element to the player who owns the element to which ownership has been newly set and has won the sub-game. The sub-game-related benefit giving section 220 maintains the ownership when the different player has won the sub-game, subtracts penalty points from the points possessed by the player who owns the element to which ownership has been newly set, and adds points corresponding to the penalty points to the points possessed by the different player.

The excessive difference-in-result reduction section 222 has an element selection function of calculating the play result of each player, and selecting an element so that the element owned by a high-ranking player is selected with higher probability, and a course layout change function of changing the layout of the course 4 to a layout in which the selected element need not be passed at a given timing.

Specifically, the excessive difference-in-result reduction section 222 determines whether or not the difference in result between a high-ranking player and a low-ranking player satisfies a given excessive difference-in-result condition at a timing when it has been determined that the game has reached a final phase (e.g., when the points possessed by the top player have reached 80% of the victory points). The excessive difference-in-result condition may be appropriately set depending on the content of the game and the like. A condition whereby the low-ranking player feels that he cannot catch up with or defeat the high-ranking player when the game process has reached a final phase is set as the excessive difference-inresult condition. The excessive difference-in-result reduction section 222 selects some of the elements owned by the high-ranking player when the excessive difference-in-result condition has been satisfied, and changes the course layout so that the selected elements cannot be used or owned.

The sound generation section 250 is implemented by a processor (e.g., digital signal processor (DSP)) and a control program, for example. The sound generation section 250 generates sound signals of a game-related effect sound, background music (BGM), and an operation sound, and outputs the generated sound signals to a sound output section 350.

The image generation section 260 is implemented by a processor (e.g., digital signal processor (DSP)), a control program, a drawing frame IC memory (e.g., frame buffer), and the like. The image generation section 260 outputs image signals of a generated image to an image display section 360.

The communication control section 270 performs a data communication process, and exchanges data with an external device via a communication section 370.

The storage section 500 stores a system program that causes the processing section 200 to control the game device 1200, a game program and data necessary for executing the board game, and the like.

In this embodiment, the storage section 500 stores a system program 501, a game program 502 for executing the board game, field initial setting data 510, castle model setting data 520, character initial setting data 522, a sub-game library 524, and sub-game selection condition option setting data 526. The storage section 500 stores field status data 530, piece status data 540, castle status data 550, and advance number management data 560. These data are generated and updated during the game. The game program 502 is read and executed by the processing section 200 so that the processing section 200 implements the functions of the game calculation section 210.

Figure 15:
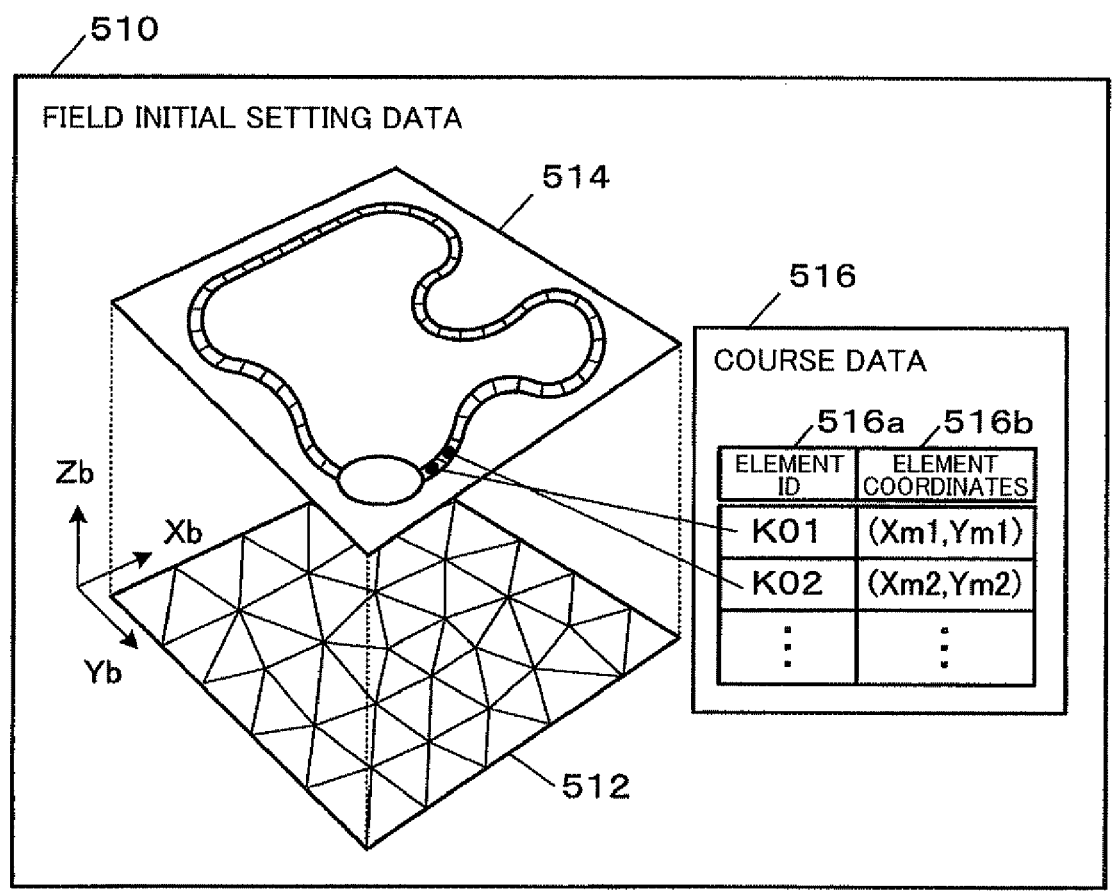
FIG. 15 is a view showing a data configuration example of field initial setting data.

The field initial setting data 510 includes a game field initial setting value. As shown in FIG. 15, the field initial setting data 510 includes the polygon model 512 of the board 2, a texture 514 applied to the polygon model, and course data 516.

The course 4 is drawn on the texture 514. The course data 516 is course setting information. The course data 516 includes an element ID 516a and element coordinates 516b of each element. The local coordinates of the polygon model 512 at the representative point of the corresponding element are stored as the element coordinates 516b. When a piece stops at the element, the coordinates of the destination are determined based on the element coordinates 516b.

Figure 16:
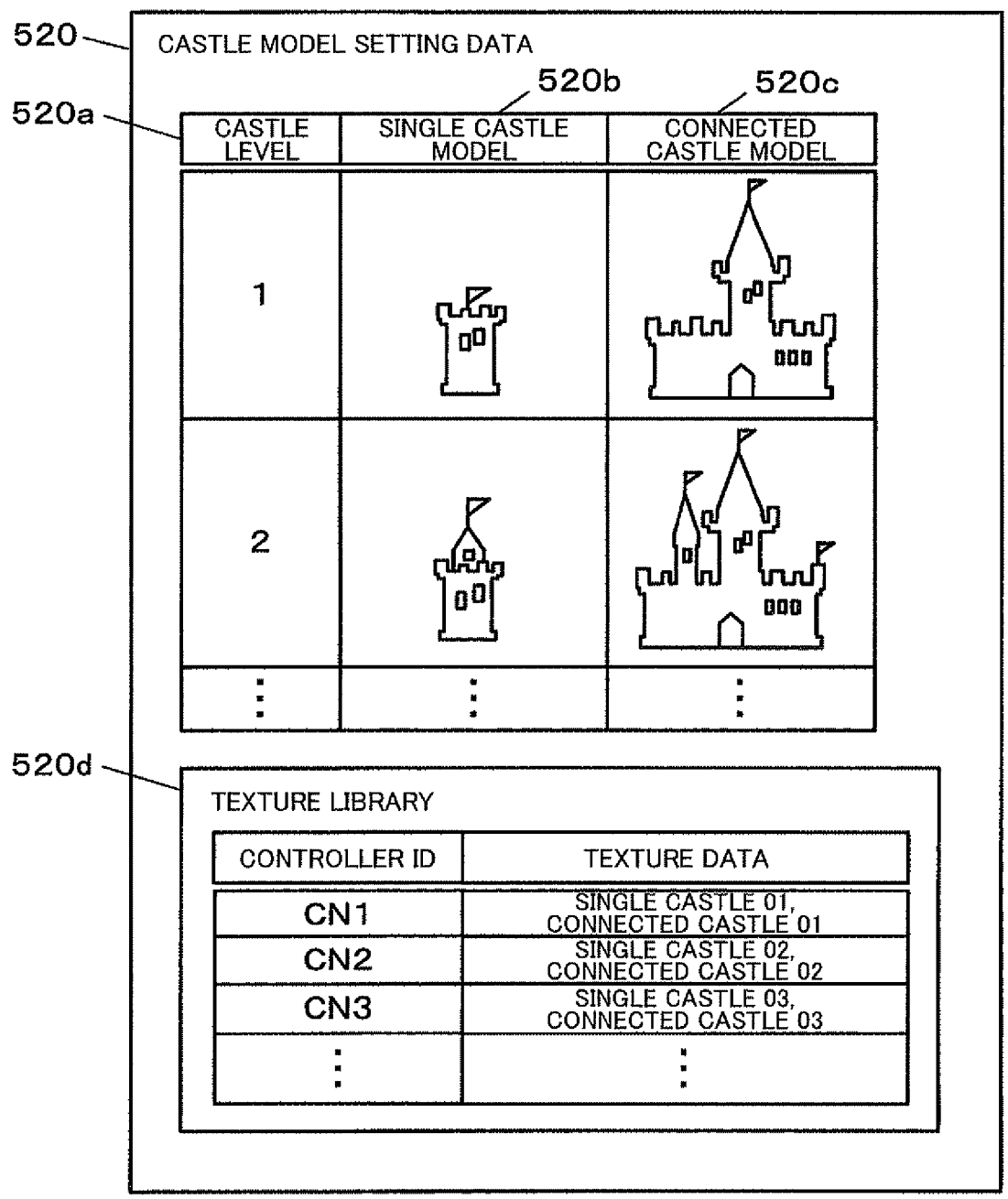
FIG. 16 is a view showing a data configuration example of castle model setting data.

The castle model setting data 520 stores information for disposing and displaying the castle 10 on the board 2. As shown in FIG. 16, the castle model setting data 520 includes a castle level 520a, a single castle model 520b, and a connected castle model 520c, for example. The single castle model 520b and the connected castle model 520c are model data. The color setting for identifying the player (owner) is set in the texture data library 520d.

The character initial setting data 522 includes information for displaying and moving various characters (e.g., piece 6 and travel means character 34) used in the main game and the sub-game on the screen.

Figure 17:
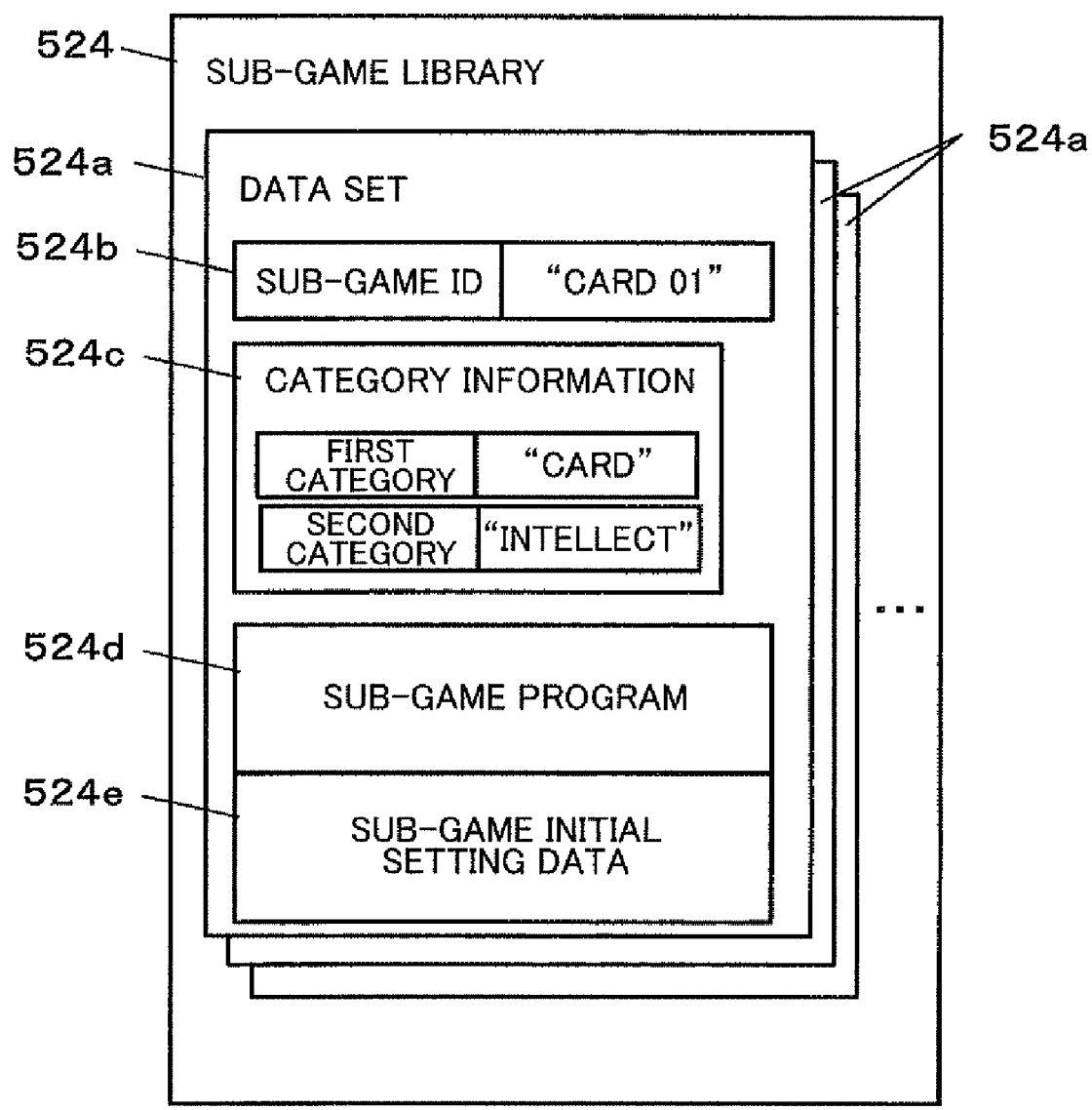
FIG. 17 is a view showing a data configuration example of a sub-game library.

The sub-game library 524 includes information for executing the sub-game, and information for categorizing and selecting the sub-game. As shown in FIG. 17, the sub-game library 524 includes one data set 524a corresponding to each sub-game, for example. The number of data sets 524a included in the library may be appropriately set.

The sub-game selection condition option setting data 526 defines the options displayed as the sub-game option condition option 26 (see FIG. 6).

As shown in FIG. 18, the sub-game selection condition option setting data 526 includes a castle level 526a and a sub-game selection condition option 526b, for example. The sub-game selection condition option 526b is set so that the sub-game is sub-categorized as the castle level increases, and is eventually selected directly as the option.

More specifically, the first categories (main categories (genres)) "card", "shooting", "race", and the like are set as the option corresponding to the castle level "1". The second categories (middle categories) included in each main category are set corresponding to the castle level "2". For example, a factor (e.g., "intellect", "speed, and "luck") that influences the game to a maximum extent is set corresponding to the first category "card".

Figure 19:
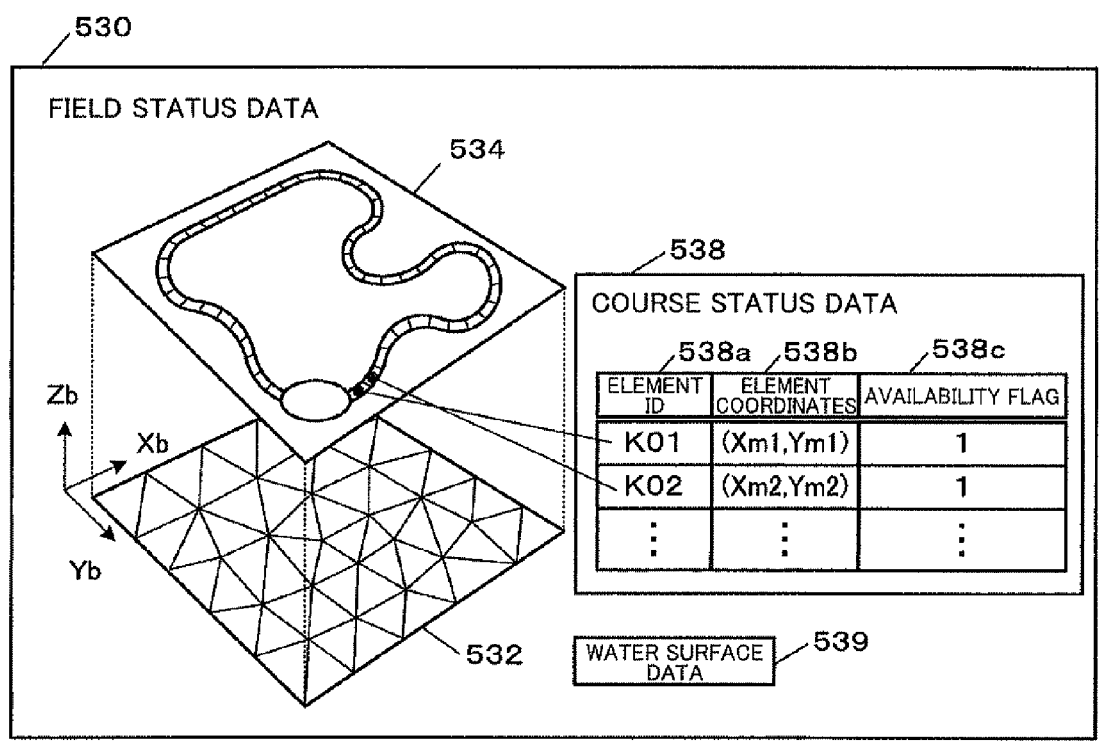
FIG. 19 is a view showing a data configuration example of field status data.

The field status data 530 includes information that indicates the status of the game field during game play. As shown in FIG. 19, the field status data 530 includes model information 532 that stores the shape of the current game field based on a duplicate of the polygon model 512 included in the field initial setting data 510, texture data 534 that indicates the current texture, course status data 538, and water surface data 539, for example.

The course status data 538 includes an element ID 538a, element coordinates 538b, and an availability flag 538c that indicates whether or not the piece 6 can be stopped at the element. The initial value of the availability flag 538c is "1 (available)". The availability flag 538c is set to "0 (unavailable)" when the element has been submerged when the board 2 has been deformed due to a change in field, for example. The water surface data 539 includes polygon data that represents the water surface object 32 (see FIG. 13) that is displayed when the field has been deformed.

As shown in FIG. 20, the piece status data 540 includes a controller ID 540a of the game controller 1230 provided for each player, a piece type 540b, a current element ID 540c where the piece is currently disposed, points 540b currently possessed by the player, an ability parameter value 540e, a color 540f, and the like.

A given starting element 5 is stored as the current element ID 540c in an initial state.

A parameter value applied to the character of each player during the sub-game is stored as the ability parameter value 540e. For example, a hit point (HP), an attack capability, a defense capability, a moving capability, speed, and the like may be appropriately set as the ability parameter value 540e.

The initial value of the points 540d may be appropriately set. The initial value of the points 540d may be set to "0", or may be set to a value that allows the player to build a given number (e.g., two) of single castles.

The color 540f is a color setting for identifying the owner that is applied to the model of the castle 10. In this embodiment, the color 540f is automatically set in order of registration.

The castle status data 550 is generated each time the castle 10 has been built, and includes information that indicates the status of the castle. As shown in FIG. 21, the castle status data 550 includes a castle ID 550a, a current element 550b, an owner ID 550c that indicates information for identifying the owner of the castle and the element, a castle level 550d, a castle model ID 550e that indicates the model of the castle disposed within the game image (screen), and a sub-game selection condition 550f, for example. In the example shown in FIG. 21, the first category, the second category, and sub-game designation are provided as the sub-game selection condition. "NULL" is set as the sub-game selection condition in an initial state. In the example shown in FIG. 21, all of the first category, the second category, and sub-game designation are set since the castle level 550d is "3".

The advance number of the piece 6 of each player is managed as the advance number management data 560. As shown in FIG. 22, the advance number management data 560 includes a controller ID 560a and an advance number 560b that indicates the advance number at the current turn, for example. A number determined by roulette is stored as the advance number 560b. The advance number 560b is subtracted (updated) each time the piece 6 of the player advances.

Process Flow

The flow of the process according to this embodiment is described below.

Figure 23:
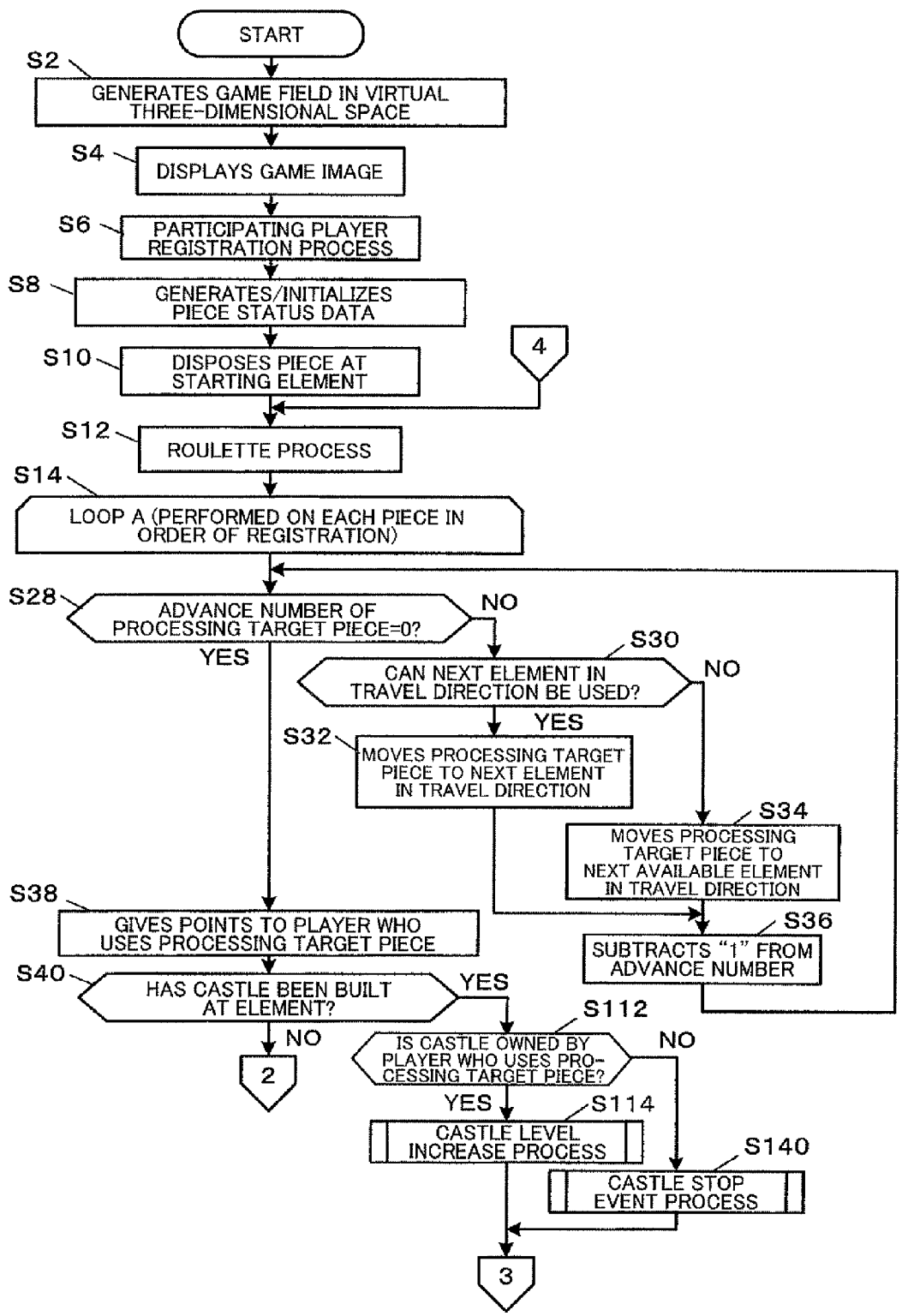
FIG. 23 is a flowchart illustrative of the flow of a main process according to one embodiment of the invention.
Figure 24:
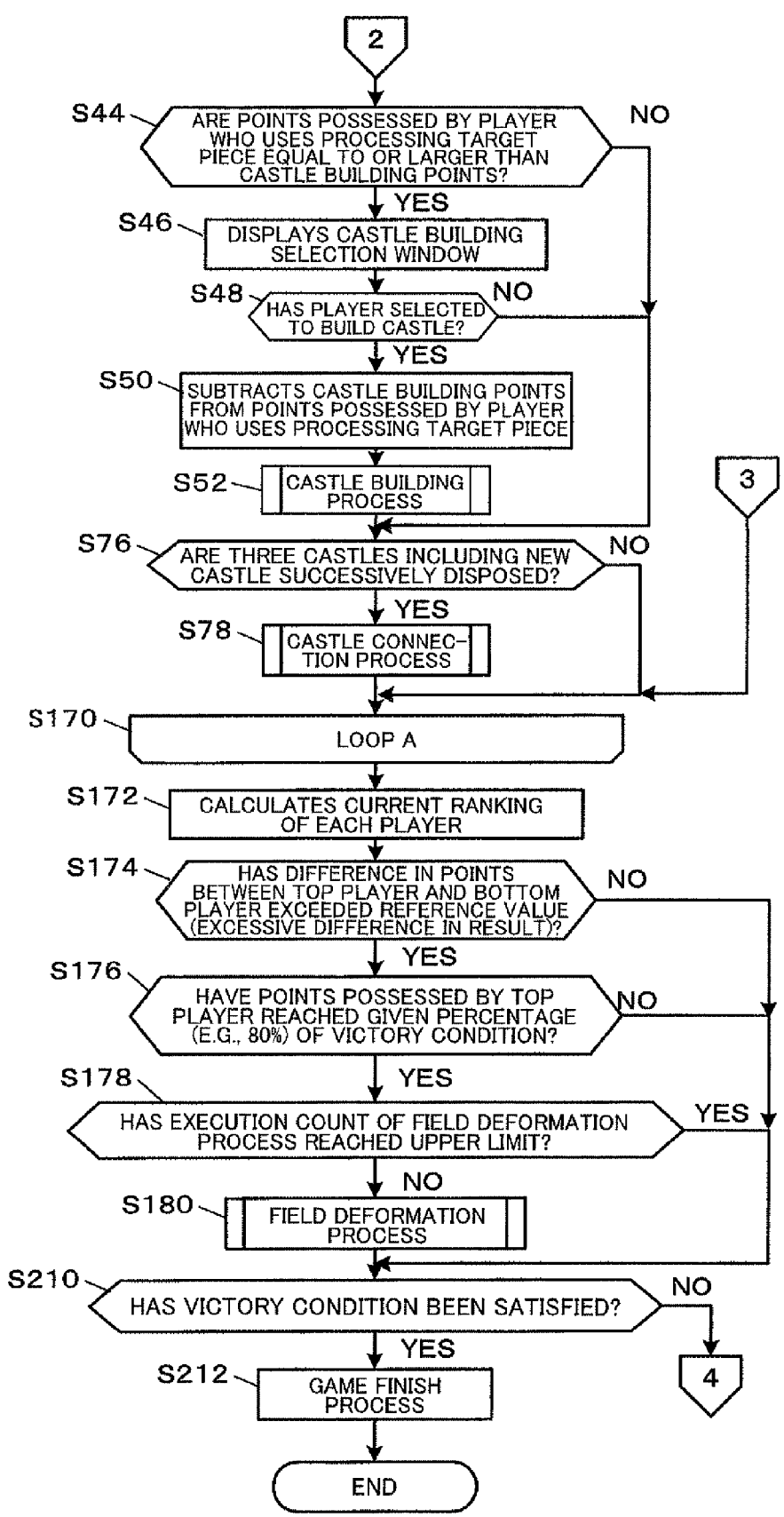
FIG. 24 is a flowchart that follows the flowchart shown in FIG. 23.

FIGS. 23 and 24 are flowcharts illustrative of the flow of the main process according to this embodiment. The processing section 200 refers to the field initial setting data 510, and generates the board (topography) 2 in which the course 4 is drawn in the virtual three-dimensional space as the game field (step S2). The processing section 200 then generates a game image (screen), and displays the game image on the image display section 360 (step S4).

The processing section 200 then performs a participating player registration process (step S6). For example, the processing section 200 registers the player name and selects the piece 6 corresponding to each game controller 1230. The piece status data 540 is generated (initialized) in the storage section 500 by the participating player registration process (step S8).

When the piece status data 540 has been generated (initialized), the processing section 200 disposes the piece 6 used by each participating player at the starting element 5 on the board 2 (step S10).

When the game has started, the processing section 200 performs a roulette process (step S12).

For example, the processing section 200 displays the roulette window 20 within the game image W4 (see FIG. 3). The roulette game of each player is displayed within the roulette window 20. Each player performs a roulette start/stop operation using the game controller 1230. The number determined by roulette is stored as the advance number 560b included in the advance number management data 560.

The processing section 200 then performs a loop A process on each piece 6 (moves each piece 6), and selects and executes the sub-game based on the status of the element to which each piece 6 has been moved (steps S14 to S170).

In the loop A process, when the advance number 560b of the processing target piece 6 is not "0" (NO in step S28), the processing section 200 refers to the field status data 530, determines that the next element in the travel direction can be used when the availability flag 538c is "1" (YES in step S30), and moves the processing target piece 6 to the next element (step S32). The processing section 200 then subtracts "1" from the advance number 560b (step S36), and returns to the step S28.

When the availability flag 538c of the next element is "0", the processing section 200 determines that the next element has been submerged due to deformation of the game field, extracts the next available element in the travel direction, displays a state in which the processing target piece 6 moves to the extracted element using the travel means character 34 (step S34), and subtracts "1" from the advance number 560b (step S36).

When the processing section 200 has determined that the advance number 560b is "0" in the step S28 (YES in step S28), the processing section 200 determines that the processing target piece 6 has advanced by the number determined by roulette (i.e., the processing target piece 6 has reached the destination element), and gives given points to the player who uses the processing target piece 6 (step S38).

The processing section 200 then refers to the castle status data 550, and determines whether or not a castle has been built at the element to which the processing target piece 6 has moved.

When a castle has not been built at the element (NO in step S40), and the points 540d possessed by the player who uses the piece have exceeded given castle building points (YES in step S44), the processing section 200 displays the castle building selection window 22 within the game image, and allows the player to select whether or not to set ownership to the element and build a castle (step S46).

When the player has selected to build a castle (YES in step S48), the processing section 200 subtracts the castle building points from the points 540d possessed by the player who uses the processing target piece (step S50), and performs a castle building process (step S52).

Figure 25:
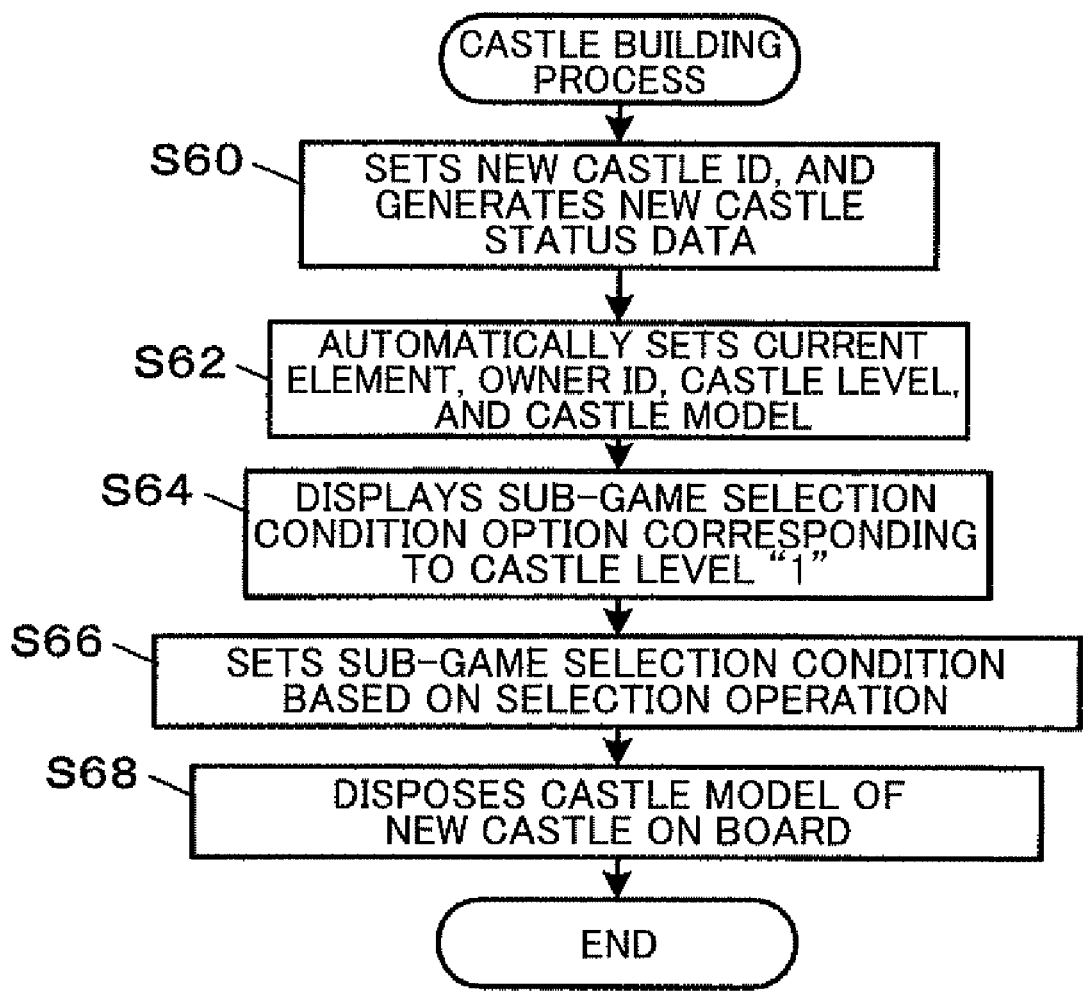
FIG. 25 is a flowchart illustrative of the flow of a castle building process.

FIG. 25 is a flowchart illustrative of the flow of the castle building process according to this embodiment. The processing section 200 sets a new castle ID 550a, and generates new castle status data 550 (step S60). The processing section 200 then automatically sets the parameter values (step S62). Specifically, the processing section 200 sets the element where the processing target piece has stopped as the current element 550b, and sets the controller ID 540a of the player who uses the processing target piece as the owner ID 550e. The processing section 200 sets "1" as the castle level 550d, and sets the single castle model 520b corresponding to the castle level "1" as the castle model ID 550e (see FIG. 16).

The processing section 200 then displays the sub-game selection condition setting window 24 for the new castle, and displays the sub-game selection condition option 26 (step S64; see FIG. 6). The processing section 200 sets the sub-game selection condition option selected by a selection operation as the sub-game selection condition 550f for the new castle (step S66), disposes the castle model of the new castle on the board 2 (step S68), and finishes the castle building process.

Again referring to FIG. 24, the processing section 200 determines whether or not a plurality of castles satisfy a given placement condition. In this embodiment, a condition whereby three castles including a new castle are successively disposed is used as the placement condition. When the placement condition has been satisfied (YES in step S76), the processing section 200 performs a castle connection process (step S78).

Figure 26:
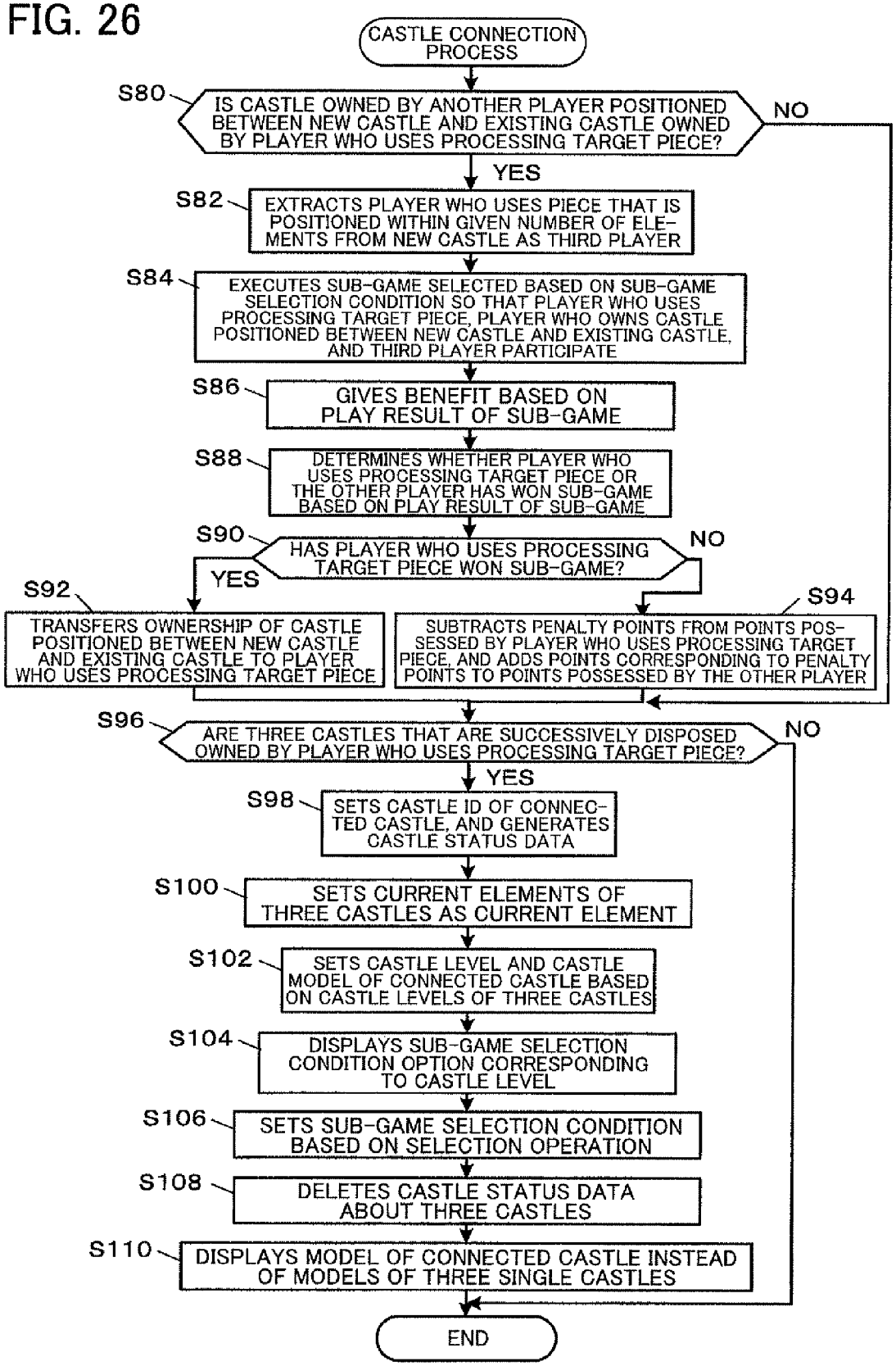
FIG. 26 is a flowchart illustrative of the flow of a castle connection process.

FIG. 26 is a flowchart illustrative of the flow of the castle connection process according to this embodiment. The processing section 200 determines whether or not a castle owned by another player is positioned between a new castle and an existing castle owned by the player who uses the processing target piece 6. When a castle owned by another player is positioned between a new castle and an existing castle owned by the player who uses the processing target piece 6 (YES in step S80), the processing section 200 extracts the player who uses the piece 6 that is positioned within a given number of elements from the new castle as a third player (step S82). The processing section 200 then executes the sub-game in which the player who uses the processing target piece 6, the player who owns the castle that is positioned between the new castle and the existing castle owned by the player who uses the processing target piece 6, and the extracted third player participate (step S84). The sub-game is selected from the sub-game library 524 according to the sub-game selection condition 550f included in the castle status data 550 about the castle that is positioned between the new castle and the existing castle owned by the player who uses the processing target piece 6.

When the processing section 200 has executed the sub-game, the processing section 200 gives a benefit based on the play result of each player (step S86). For example, the processing section 200 gives bonus points, increases the ability parameter value 540e, or gives an item that can be used in the main game or the sub-game. In this embodiment, the processing section 200 gives bonus points. In this embodiment, participation bonus points are given to the third player, and victory points are given to the third player when the third player has won the sub-game. The participation bonus points are given to the player who uses the processing target piece 6 and the player who owns the castle that is positioned between the new castle and the existing castle owned by the player who uses the processing target piece 6.

The processing section 200 then determines whether the player who uses the processing target piece 6 or the player who owns the castle that is positioned between the new castle and the existing castle owned by the player who uses the processing target piece 6 has won the sub-game based on the play result of the sub-game (step S84).

When the player who uses the processing target piece 6 has won the sub-game (YES in step S90), the processing section 200 transfers the ownership of the castle that is positioned between the new castle and the existing castle owned by the player who uses the processing target piece 6, to the player who uses the processing target piece 6 (step S92). When the player who owns the castle that is positioned between the new castle and the existing castle owned by the player who uses the processing target piece 6 has won the sub-game (NO in step S90), the processing section 200 subtracts penalty points from the points possessed by the player who uses the processing target piece 6, and adds points corresponding to the penalty points to the points possessed by the player who has won the sub-game. Specifically, the processing section 200 transfers points corresponding to the penalty points between the players (step S94).

When a castle owned by another player is not positioned between castles owned by the player who uses the processing target piece 6 (NO in step S80), the processing section 200 skips the steps S82 to S94.

The processing section 200 determines whether or not castles that are successively disposed satisfy a given connection condition (step S96). In this embodiment, the processing section 200 determines whether or not three castles that are successively disposed are owned by the player who uses the processing target piece 6.

When castles that are successively disposed satisfy a given connection condition (YES in step S96), the processing section 200 replaces these castles with the connected castle 12. Specifically, the processing section 200 sets the castle ID 550a of the connected castle 12, and generates the castle status data 550 about the connected castle 12 (step S98). In this case, the processing section 200 sets the controller ID 540a of the player who uses the processing target piece 6 as the owner ID 550c.

The processing section 200 registers the current elements of the three castles as the current element 550b (step S100), and sets the castle level 550d based on the castle levels of the three castles (step S102). For example, the average value of the castle levels of the three castles may be rounded off and set as the castle level 550d, or the maximum castle level may be set as the castle level 550d. The castle model 550e is automatically selected (set) from the castle model setting data 520 based on the calculated castle level.

The processing section 200 then displays the sub-game selection condition setting window 24 for the new castle, and displays the sub-game selection condition option 26 corresponding to the castle level 550d of the connected castle (step S104). The processing section 200 then sets the sub-game selection condition 550f for the connected castle based on a selection operation performed using the sub-game selection condition setting window 24 (step S106).

When the castle level 550d of the connected castle is "2", the steps S104 and S106 may be repeated so that the player selects the first category corresponding to the castle level "1", and then selects the second category. When the maximum castle level of the three castles is set as the castle level 550d of the connected castle 12, the sub-game selection condition 550f for the castle having the maximum castle level may be used (i.e., the step S106 may be omitted). Alternatively, the selection condition determined in the step S104 may be displayed as a default sub-game selection condition option 26, and may be changed in the step S106.

The processing section 200 then deletes the castle status data 550 about the three castles (step S108). The processing section 200 then displays the model of the connected castle instead of the models of the three single castles disposed on the board 2 (step S110), and finishes the castle connection process.

Again referring to FIG. 24, the processing section 200 then finishes the loop A process on the processing target piece 6.

Again referring to FIG. 23, when the processing section 200 has determined that a castle has been built at the element to which the processing target piece 6 has moved in the step S40 (YES in step S40), the processing section 200 determines whether the castle is owned by the player who uses the processing target piece 6 (step S112).

When the castle is owned by the player who uses the processing target piece 6 (YES in step S112), the processing section 200 performs a castle level increase process (step S114).

Figure 27:
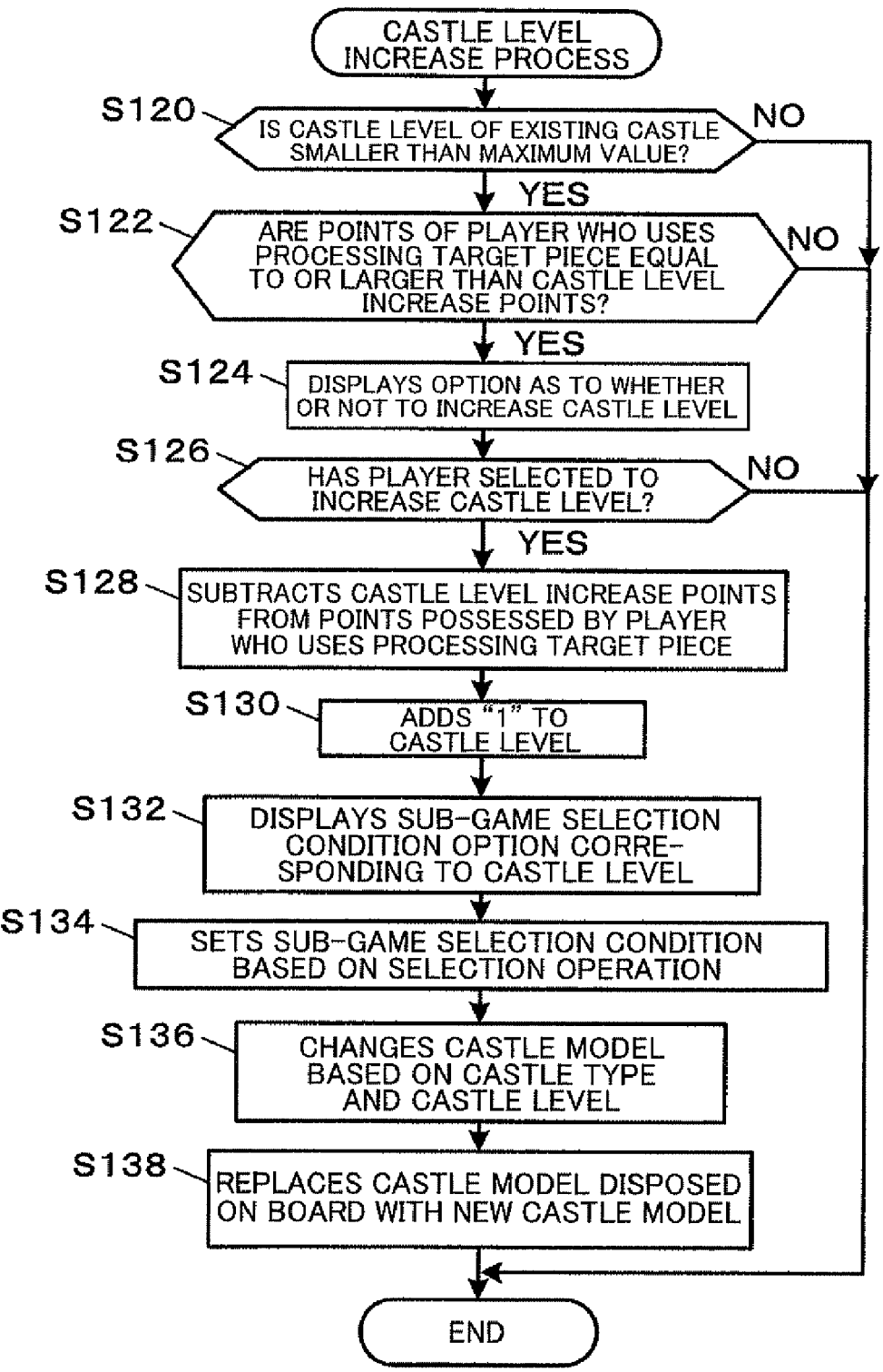
FIG. 27 is a flowchart illustrative of the flow of a castle level increase process.

FIG. 27 is a flowchart illustrative of the flow of the castle level increase process according to this embodiment. The processing section 200 refers to the castle status data 550 about the castle that is built at the element at which the processing target piece 6 has stopped, and compares the castle level 550d with a given maximum value ("5" in this embodiment).

When the castle level 550f is smaller than the maximum value (YES in step S120), and the points 540d of the player who uses the processing target piece 6 are equal to or larger than castle level increase points (YES in step S122), the processing section 200 displays an option as to whether or not to increase the castle level of the castle within the game image (step S124). When the player has selected to increase the castle level (YES in step S126), the processing section 200 subtracts the castle level increase points from the points possessed by the player who uses the processing target piece 6 (step S128), and adds "1" to the castle level 550f (step S130).

The processing section 200 then displays the sub-game selection condition setting window 24 (step S132), and changes the sub-game selection condition 550f for the existing castle based on a selection operation (step S134). The processing section 200 changes the castle model ID 550e based on the new castle level (step S136), replaces the castle model disposed on the board 2 with a new castle model (step S138), and finishes the castle level increase process.

Note that the processing section 200 finishes the castle level increase process when the castle level 550f has reached the maximum value in the step S120 (NO in step S120), when the points possessed by the player who uses the processing target piece 6 are insufficient for increasing the castle level (NO in step S122), or when the player does not desire to increase the castle level (NO of step S126).

The processing section 200 then finishes the loop A process on the processing target piece 6.

When the processing section 200 has determined that the castle is not owned by the player who uses the processing target piece 6 (NO in step S112), i.e., the processing target piece 6 has stopped at the element where a castle owned by another player has been built (NO in step S112), the processing section 200 performs a castle stop event process (step S140).

Figure 28:
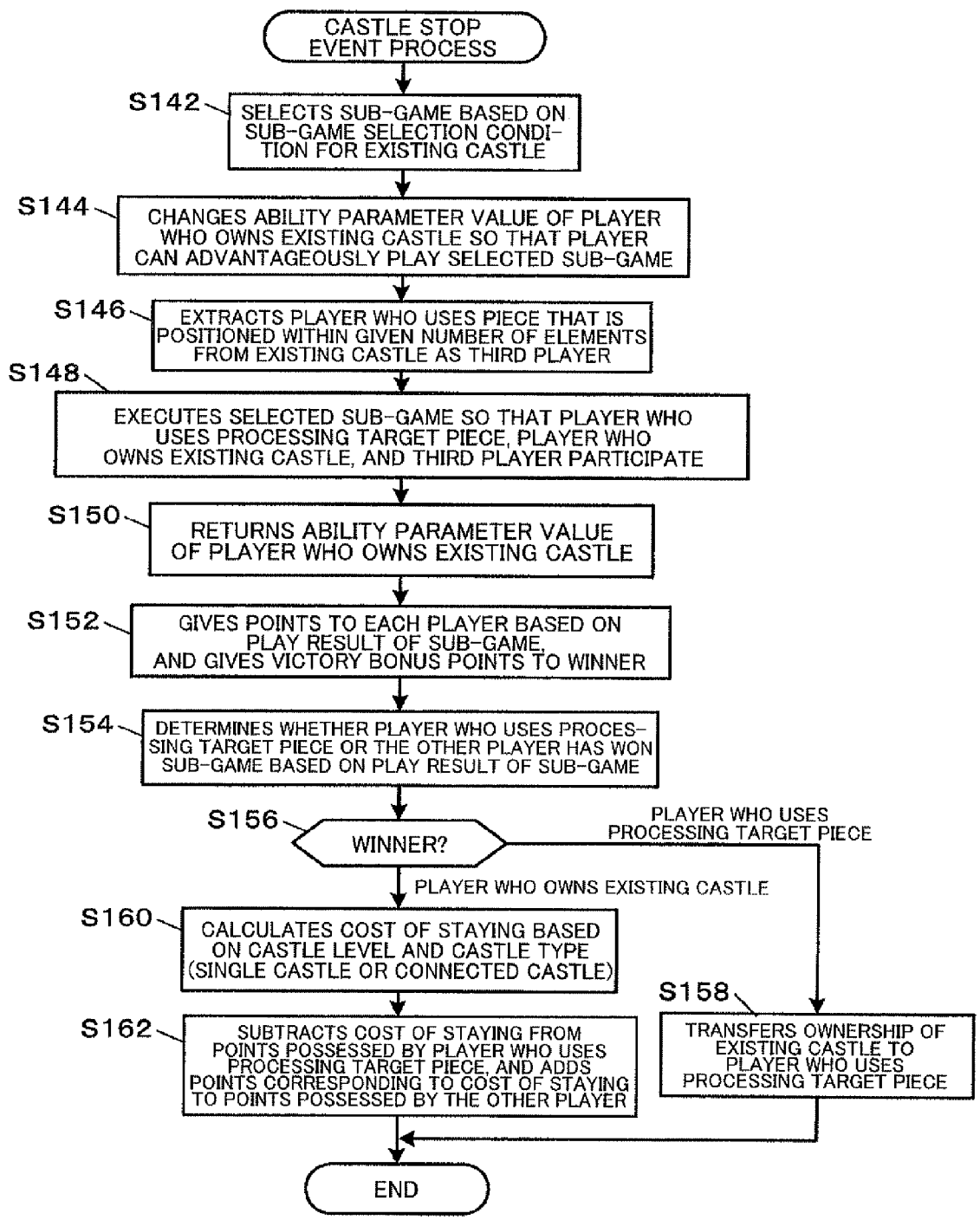
FIG. 28 is a flowchart illustrative of the flow of a castle stop event process.

FIG. 28 is a flowchart illustrative of the flow of the castle stop event process according to this embodiment. The processing section 200 refers to the castle status data 550 about the existing castle, and selects one sub-game based on the sub-game selection condition 550f (step S142). The processing section 200 then changes the ability parameter value 540e of the player who owns the existing castle so that the player can advantageously play the selected sub-game (step S144).

The processing section 200 then extracts the player who uses the piece 6 that is positioned within a given number of elements from the existing castle as a third player (step S146). The processing section 200 then executes the sub-game in which the player who uses the processing target piece 6, the player who owns the existing castle, and the extracted third player participate (step S148).

When the sub-game has ended, the processing section 200 returns the ability parameter value of the player who owns the existing castle (step S150), gives points to each player based on the play result of the sub-game, and gives victory bonus points to the winner of the sub-game (step S152).

The processing section 200 then determines whether the player who uses the processing target piece 6 or the player who owns the existing castle has won the sub-game based on the play result of the sub-game (step S154).

When the player who uses the processing target piece 6 has won the sub-game ("PLAYER WHO USES PROCESSING TARGET PIECE" in step S156), the processing section 200 changes the owner ID 550c of the existing castle to the controller ID 540a corresponding to the player who uses the processing target piece 6 (i.e., transfers ownership) (step S158), and finishes the castle stop event process.

When the player who owns the existing castle has won the sub-game ("PLAYER WHO OWNS EXISTING CASTLE" in step S156), the processing section 200 refers to the castle status data 550 about the existing castle, and calculates points used as the cost of staying based on the castle level 550d and the castle type (single castle or connected castle) determined from the castle model ID 550e (step S160). A calculation function for the points used as the cost of staying may be appropriately set. The calculation function is preferably set so that the cost of staying increases as the castle level increases, and increases when the castle type is the connected castle as compared with the single castle.

The processing section 200 then subtracts the calculated points (cost of staying) from the points 540d possessed by the player who uses the processing target piece 6, and adds points corresponding to the cost of staying to the points 540d possessed by the other player (step S162). The processing section 200 thus completes the castle stop event process.

The processing section 200 then finishes the loop A process on the processing target piece 6 (step S170; FIG. 24).

When the processing section 200 has finished the loop A process on each piece 6, the processing section 200 calculates the current ranking based on the points 540d possessed by each player (step S172).

When the difference in points between the top player and the bottom player has exceeded a given reference value (YES in step S174), and the points 540d possessed by the top player have reached 80% of a given victory condition (YES in step S176), the processing section 200 determines the excessive difference-in-result condition has been satisfied, and it is necessary to reduce the excessive difference in result. When the execution count of a field deformation process has not reached a given upper limit (e.g., 2) (NO in step S178), the processing section 200 performs the field deformation process (step S180).

Figure 29:
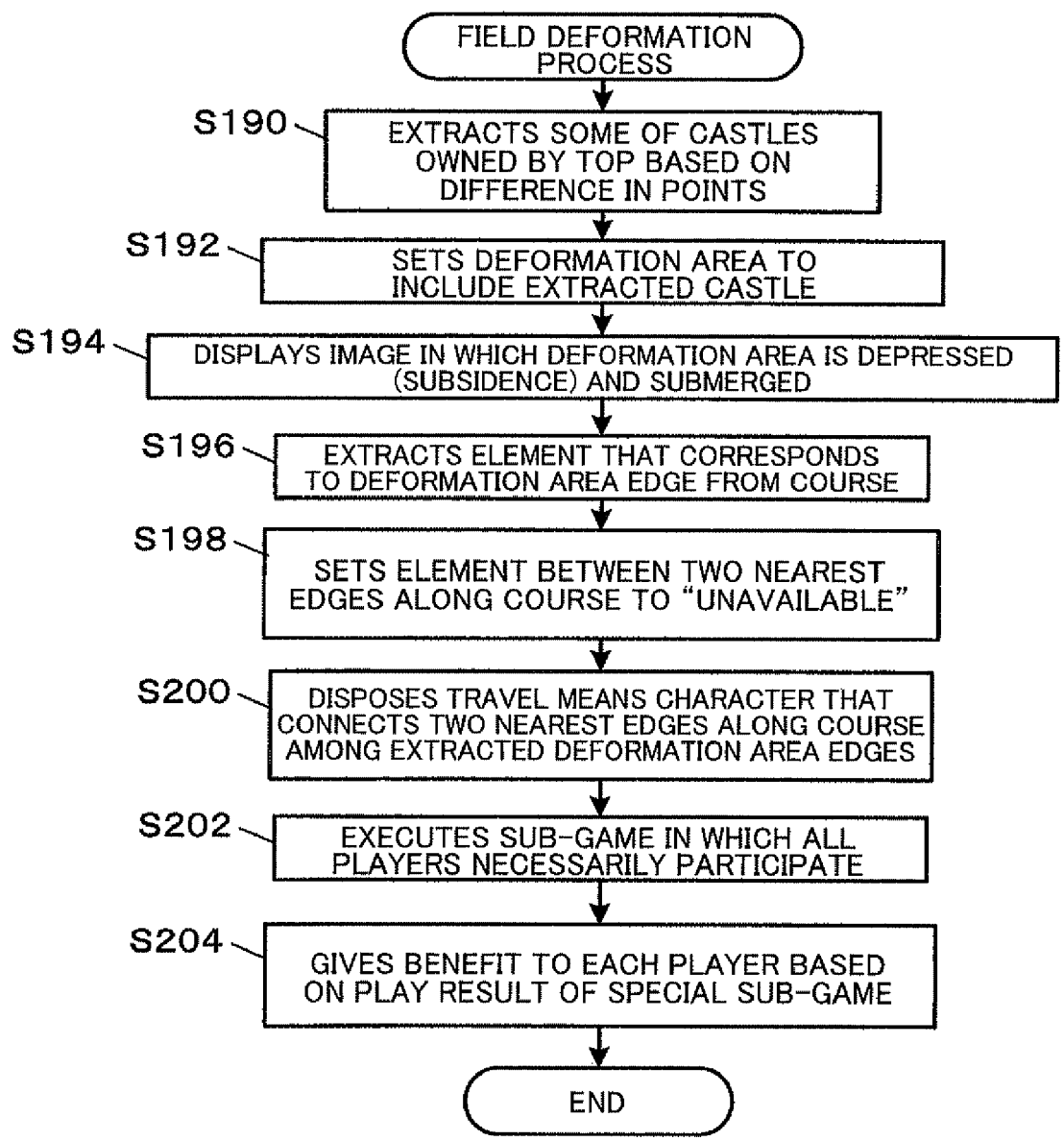
FIG. 29 is a flowchart illustrative of the flow of a field deformation process.

FIG. 29 is a flowchart illustrative of the flow of the field deformation process according to this embodiment. The processing section 200 extracts some of the castles 10 owned by the top player so that the number of castles extracted increases as the difference in points increases (step S190), and sets the deformation area 16 to include each of the extracted castles (step S192; see FIG. 12).

The processing section 200 displays an image in which the deformation area is depressed (subsidence), and submerged (step S194). Specifically, the processing section 200 reduces the coordinates of the polygon of the deformation area 16 in the height direction, and disposes the water surface object 32 over the deformation area 16 so that the deformation area 16 is submerged. The information that defines the position and the shape of the water surface object 32 is included in the field status data 530 as the water surface data 539.

The processing section 200 then extracts the element that corresponds to the deformation area edge (deformation area edges Ed1 to Ed4 in FIG. 13) from the course 4 (step S196), and sets the element between the two nearest edges along the course to "unavailable" (step S198).

In the example shown in FIG. 13, the processing section 200 sets the availability flag 538c of the element between the deformation area edges Ed1 and Ed2 and the element between the deformation area edges Ed3 and Ed4 to "0 (unavailable)" (see FIG. 19).

The processing section 200 then disposes the travel means character 34 that connects the two nearest edges along the course among the deformation area edges Ed1 to Ed4 (step S200). When the piece 6 has reached the deformation area edge Ed1 or Ed3, the travel means character 34 is automatically controlled to move to the deformation area edge Ed1 or Ed3, and move the piece 6 to the deformation area edge Ed2 or Ed4.

The processing section 200 then executes a special sub-game in which all of the players necessarily participate (step S202). The special sub-game is provided in the sub-game library 524 in addition to the sub-game selected by the castle connection process or the castle stop event process.

The processing section 200 gives a benefit to each player based on the play result of the special sub-game (step S204), and finishes the field deformation process.

When the field deformation process has ended, the execution count of the field deformation process is stored in the storage section 500. This prevents a situation in which the field is frequently deformed in the second half of the game so that the player loses interest (see step S178).

Again referring to FIG. 24, the processing section 200 determines whether or not the points 540d possessed by each player have satisfied a given victory condition.

When the victory condition has not been satisfied (NO in step S210), the processing section 200 returns to the step S12, and executes the roulette process. When the victory condition has been satisfied (YES in step S210), the processing section 200 performs a game finish process (e.g., displays a scene in which the piece 6 used by the player who has satisfied the victory condition is praised) (step S212), and finishes the series of processes.

According to this embodiment, a number of factors that enliven the game are provided.

Specifically, when determining the advance number of each player by roulette, all of the participating players simultaneously play roulette within an identical game image. This prevents a situation in which the player merely observes the game play of another player while waiting for his turn.

Second, the sub-game is executed when the piece 6 of another player has stopped at the element 3 in which the castle 10 has been built and to which ownership has been set. In this case, the player who owns the castle 10 and the element 3, the other player whose piece 6 has stopped at the element 3, and a third player who uses the piece 6 positioned around the element 3 participate in the sub-game. It is possible to enhance a situation in which the players enjoy the game together by causing the third player to participate in the sub-game. Moreover, since a benefit is given to the third player based on the play result of the sub-game, it is possible to motivate the third player to play the sub-game.

The sub-game is selected based on the selection condition selected by the player who owns the castle 10 and the element 3. Specifically, the player who owns the castle 10 and the element 3 can play a match in his favorite genre. A known board game does not have such a configuration. The player who owns the castle 10 and the element 3 can play the sub-game according to his plan. On the other hand, the player who has stopped the piece finds himself in a predicament. This effectively enlivens the game.

Third, when castles owned by one player are positioned on either side of a castle owned by another player, the sub-game is executed for the ownership of the castle positioned between the two castles. However, since the piece 6 is moved based on the number determined by roulette, the player can further enjoy the game by creating such a situation.

When three single castles owned by an identical player have been successively positioned, these castles are replaced with the connected castle 12 for which the cost of staying increases. This also ensures that the player can enjoy the game by creating such a situation.

Fourth, when the difference in result between a high-ranking player and a low-ranking player has increased to a large extent, the game field is deformed due to an accidental event to create a situation disadvantageous for the high-ranking player (i.e., a situation advantageous for the low-ranking player).

Modifications

Several embodiments to which the invention is applied have been described above. Note that the invention is not limited thereto. Various modifications may be appropriately made, such as adding other elements, omitting some of the elements, or changing some of the elements.

Figure 30:
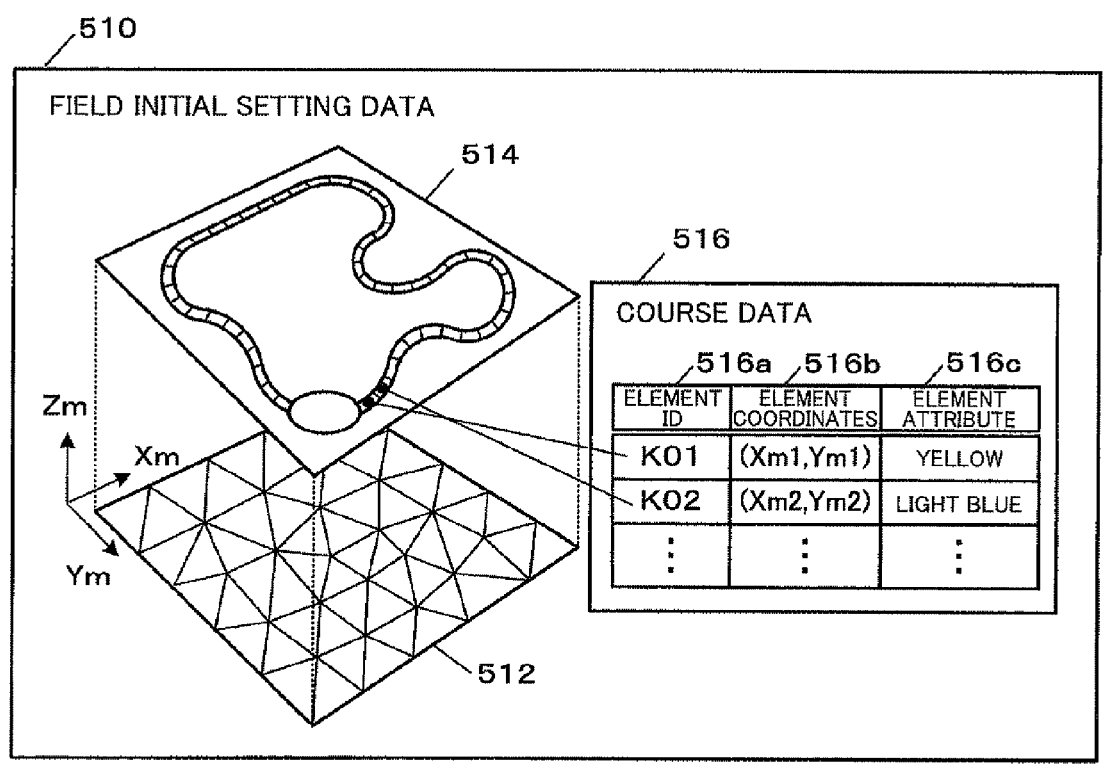
FIG. 30 is a view showing a data configuration example of a modification of field initial setting data.
Figure 31:
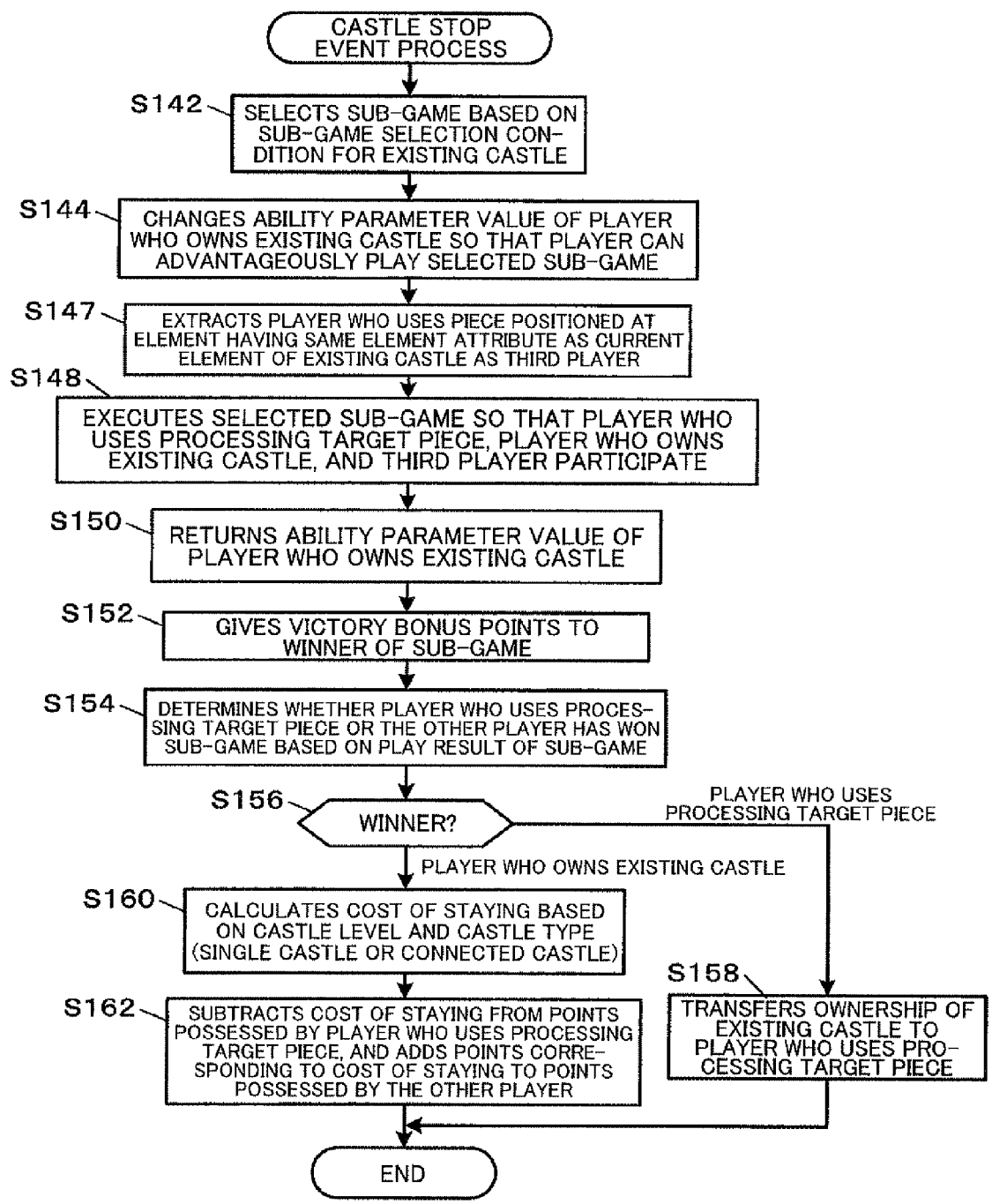
FIG. 31 is a flowchart illustrative of the flow of a modification of a castle stop event process.

For example, the above embodiments have been described taking an example in which the player who uses the piece 6 that is positioned within a given number of elements around the castle is selected as the third player. Note that the third player may be appropriately set by another method (condition). As shown in FIG. 30, an element attribute 516c of each element may be set as the course data 516 included in the field initial setting data 510, and the player who uses the piece 6 that is positioned at the element having the same element attribute as the current element of the castle 10 may be selected referring to the mini-game selection condition. Specifically, the player who uses the piece that is positioned at the element having the same element attribute as the current element of the existing castle may be extracted as the third player (step S147) instead of performing the step S146 of the castle stop event process (see FIG. 31).

The above embodiments have been described taking an example in which the loop A process is performed on each piece after the roulette process. Specifically, each piece advances by the number determined by roulette, and the castle building process or the like is performed depending on the element at which each piece has stopped. Note that the processing target of the loop A process may be changed each time the piece advances by one element so that each piece advances at the same time. Specifically, the loop A process may be divided into a first loop process (step S28: NO to step S36) and a second loop process (step S28: YES to step S78). The first loop process may be performed on each piece while changing the processing target each time the piece advances by one element, and the second loop process may then be performed on each piece. This creates a situation in which each piece advances along the course at the same time. Specifically, since the piece used by each player moves immediately after the roulette process, it suffices that each player wait for the piece used by another player to move for a short time. Note that the piece that can advance to the next element may be extracted, and each of the extracted pieces may be advanced by one element at the same time.

In this case, a plurality of pieces may stop at an identical element at the same time. Therefore, the second loop process is performed. It is preferable that the second loop process include (1) a step that extracts the pieces that have stopped at an identical element in the same control cycle, (2) a step that executes a given sub-game or a sub-game randomly selected from the sub-game library 524 in which the extracted pieces participate, and (3) a step that determines that the loop A process has been finished for the piece used by the player who has lost the sub-game immediately before the step S44, and the steps S44 to S78 be performed on only the piece used by the player who has won the sub-game.

This makes it possible to implement a novel game in which the players can have a chance to acquire ownership even if a plurality of pieces have stopped at an identical element at the same time, and the sub-game is executed for the ownership of the element.

A stationary consumer game device has been illustrated above as an electronic instrument that implements the above embodiments. Note that the invention may also be applied to other electronic instruments such as an arcade game device, a portable game device, a personal computer, a multi-functional mobile phone or a music player that can execute application software, and a car navigation system.

Each player who participates in the game may use an electronic device, and the electronic devices may exchange and share information about the game process via wireless communication to implement a communication game.

In this case, each electronic device may connect to a server device to implement an online game.

The above embodiments have been described taking an example in which the object for identifying ownership is designed as a castle. Note that the object for identifying ownership may be designed as a house, a vehicle, a pet, a flag, a plant, a robot, or the like. Each player may individually select and set the design before the game starts instead of using a common design.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An execution control method for a game that is implemented by a processor, the method comprising:
setting ownership to an element in the game to which ownership has not been set when a piece has stopped at the element;
executing a sub-game when a first piece has stopped at an element to which ownership has been set by a second piece, the first piece and the second piece participating in the sub-game, the executing the sub-game includes causing a third piece that is positioned within a predetermined range based on a position of the element at which the first piece has stopped to participate in the sub-game;
transferring the ownership set to the element at which the first piece has stopped to the first piece when the first piece has won the sub-game;
giving a benefit to the second piece when the second piece has won the sub-game; and
giving a benefit to the third piece when the third piece has won the sub-game.

2. The method as defined in claim 1, further comprising:
setting a selection condition for the sub-game that is executed when the first piece has stopped at the element to which ownership has been set, wherein
the step of executing the sub-game further includes selecting a sub-game from a plurality of sub-games based on the selection condition set for the element at which the first piece has stopped, and executing the selected sub-game.

3. The method as defined in claim 2, wherein
the selection condition includes a condition that designates a category of the sub-game.

4. The method as defined in claim 1, wherein
the predetermined range is a number of elements between the element and another element on which the third piece is positioned.

5. The method as defined in claim 1, further comprising:
selecting an element so that an element owned by a player having a ranking larger than a predetermined amount larger than a ranking of a second player is selected with higher probability; and
changing the layout of a course to a layout in which the selected element cannot be used or owned at a given timing.

6. A non-transitory computer-readable medium storing a program that, when executed by a processor, causes a computer to execute the method as defined in claim 1.

7. An electronic instrument comprising:
an ownership setting section that sets ownership to an element to which ownership has not been set when a piece has stopped at the element;
a sub-game execution control section that executes a sub-game when a first piece has stopped at an element to which ownership has been set by a second piece, the first piece and the second piece participating in the sub-game, the control section causing a third piece that is positioned within a given range based on a position of the element at which the first piece has stopped to participate in the sub-game;
an ownership transfer section that transfers the ownership set to the element at which the first piece has stopped to the first piece when the first piece has won the sub-game; and
a benefit giving section that gives a benefit to the second piece when the second piece has won the sub-game and gives a benefit to the third piece when the third piece has won the sub-game.

8. An execution control method for a game that is implemented by a processor, the method comprising:
setting ownership to an element in the game to which ownership has not been set when a piece has stopped at the element;
setting an ownership level selected from a hierarchy of ownership levels to an element to which ownership has been set;
selecting a category of a sub-game associated with the element based on the ownership level;
executing the sub-game when a first piece has stopped at the element to which ownership has been set by a second piece, the first piece and the second piece participating in the sub-game;
transferring the ownership set to the element at which the first piece has stopped to the first piece when the first piece has won the sub-game; and
giving a benefit to the second piece when the second piece has won the sub-game.

9. The method as defined in claim 8, wherein
the step of executing the sub-game further includes causing the third piece that is positioned at an element to which an attribute has been set to participate in the sub-game, the attribute set to the element at which the third piece is positioned having a given relationship with an attribute set to the element at which the first piece has stopped.

10. An execution control method for a game that is implemented by a processor, the method comprising:
forming a layout of a course by arranging a plurality of elements;
setting ownership to an element in the game to which ownership has not been set when a piece has stopped at the element;
executing a sub-game when a first piece has stopped at an element to which ownership has been set by a second piece, the first piece and the second piece participating in the sub-game;
transferring the ownership set to the element at which the first piece has stopped to the first piece when the first piece has won the sub-game;
giving a benefit to the second piece when the second piece has won the sub-game;
selecting an element so that an element owned by a player having a ranking larger than a predetermined amount larger than a ranking of a second player is selected with higher probability; and
changing the layout of the course to a new layout in which the selected element cannot be used or owned at a given timing.

* * * * *